United States Patent
Zhao et al.

(10) Patent No.: US 10,638,526 B2
(45) Date of Patent: Apr. 28, 2020

(54) TRANSPORT OF CONTROL PROTOCOL FOR TRUSTED WLAN (TWAN) OFFLOAD

(71) Applicant: QUALCOMM Incorporated, San Diego, CA (US)

(72) Inventors: Suli Zhao, San Diego, CA (US); Srinivasan Balasubramanian, San Diego, CA (US); Gerardo Giaretta, San Diego, CA (US); Arungundram Chandrasekaran Mahendran, San Diego, CA (US); Ajith Tom Payyappilly, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/033,373

(22) Filed: Sep. 20, 2013

(65) Prior Publication Data
US 2014/0086226 A1 Mar. 27, 2014

Related U.S. Application Data

(60) Provisional application No. 61/719,893, filed on Oct. 29, 2012, provisional application No. 61/705,034,
(Continued)

(51) Int. Cl.
*H04W 76/12* (2018.01)
*H04W 76/15* (2018.01)
(Continued)

(52) U.S. Cl.
CPC ............ *H04W 76/12* (2018.02); *H04W 76/11* (2018.02); *H04W 8/20* (2013.01);
(Continued)

(58) Field of Classification Search
CPC ... H04W 8/20; H04W 36/0027; H04W 36/14; H04W 76/021; H04W 76/022;
(Continued)

(56) References Cited

U.S. PATENT DOCUMENTS

| 8,254,294 B2 | 8/2012 | Vesterinen |
| 8,477,724 B2 | 7/2013 | Bakker et al. |
| 2004/0010569 A1* | 1/2004 | Thomas et al. ............... 709/220 |
| 2005/0220144 A1* | 10/2005 | Ishiyama et al. ............. 370/471 |

(Continued)

FOREIGN PATENT DOCUMENTS

| CN | 1645826 A | 7/2005 |
| CN | 101873589 A | 10/2010 |

(Continued)

OTHER PUBLICATIONS

3GPP TR 23.861 V1.1.1, "3rd Generation Partnership Project, Technical Specification Group Services and System Aspects, Multi access PDN connectivity and IP flow mobility (Release 9)", 3GPP Standard,3GPP TR 23.861, 3rd Generation Partnership Project (3GPP), Mobile Competence Centre, 658, Route Des Lucioles, F-06921 Sophia-Antipolis Cedex, France, No. V1.1.1. Apr. 1, 2009 (Apr. 1, 2009), XP858363989, pp. 1-47.

(Continued)

*Primary Examiner* — Harun Chowdhury
(74) *Attorney, Agent, or Firm* — Patterson & Sheridan LLP

(57) ABSTRACT

Certain aspects of the present disclosure generally relate to wireless communications and, more particularly, to methods and apparatus for utilizing a control protocol to establish multiple packet data network (PDN) connections through a trusted wide area network (TWAN). Techniques are provided for expanding mobile network capacity by offloading traffic from wireless wide area networks (WWAN) to other types of networks, including wireless local area networks (WLAN).

28 Claims, 21 Drawing Sheets

Related U.S. Application Data filed on Sep. 24, 2012, provisional application No. 61/705,104, filed on Sep. 24, 2012.

(51) Int. Cl.

| | |
|---|---|
| *H04W 76/11* | (2018.01) |
| *H04W 8/20* | (2009.01) |
| *H04W 36/00* | (2009.01) |
| *H04W 36/14* | (2009.01) |

(52) U.S. Cl.
CPC ........ *H04W 36/0027* (2013.01); *H04W 36/14* (2013.01); *H04W 76/15* (2018.02)

(58) Field of Classification Search
CPC ..... H04W 76/02; H04W 76/11; H04W 76/12; H04W 76/15; H04L 61/2038; H04L 61/6022
USPC .......................... 370/235, 329, 331, 338, 328
See application file for complete search history.

(56) References Cited

U.S. PATENT DOCUMENTS

| | | | | |
|---|---|---|---|---|
| 2006/0190721 | A1* | 8/2006 | Kawakami | H04L 63/08 713/161 |
| 2008/0026724 | A1 | 1/2008 | Zhang | |
| 2008/0305772 | A1 | 12/2008 | Balasubramanian et al. | |
| 2009/0197597 | A1* | 8/2009 | Kotecha | 455/433 |
| 2010/0121938 | A1* | 5/2010 | Saugnac | 709/218 |
| 2010/0290446 | A1 | 11/2010 | Atreya et al. | |
| 2011/0238822 | A1 | 9/2011 | Weniger et al. | |
| 2012/0063428 | A1* | 3/2012 | Ng et al. | 370/338 |
| 2012/0069797 | A1 | 3/2012 | Lim et al. | |
| 2012/0182934 | A1* | 7/2012 | Diachina et al. | 370/328 |
| 2012/0189016 | A1 | 7/2012 | Bakker et al. | |
| 2012/0269167 | A1* | 10/2012 | Velev et al. | 370/331 |
| 2013/0031271 | A1 | 1/2013 | Bosch et al. | |
| 2013/0121322 | A1* | 5/2013 | Salkintzis | 370/338 |
| 2013/0265985 | A1 | 10/2013 | Salkintzis | |
| 2013/0343304 | A1* | 12/2013 | Kaippallimalil | H04W 28/18 370/329 |
| 2014/0036807 | A1* | 2/2014 | Huang et al. | 370/329 |
| 2014/0071907 | A1* | 3/2014 | Roeland | H04W 76/021 370/329 |
| 2014/0071945 | A1* | 3/2014 | Li | 370/331 |
| 2014/0071969 | A1* | 3/2014 | Roeland | H04W 76/026 370/338 |
| 2014/0078986 | A1* | 3/2014 | Kaippallimalil | H04W 76/02 370/329 |
| 2014/0269551 | A1* | 9/2014 | Henderickx | H04W 76/022 370/329 |

FOREIGN PATENT DOCUMENTS

| | | |
|---|---|---|
| CN | 101931946 A | 12/2010 |
| EP | 2410701 A1 | 1/2012 |
| EP | 2418701 A2 | 2/2012 |
| EP | 2448304 A1 | 5/2012 |
| JP | 2010288223 A | 12/2010 |
| JP | 2011010280 A | 1/2011 |
| JP | 2012531134 A | 12/2012 |
| TW | 201220848 A | 5/2012 |
| WO | WO-2008154440 A2 | 12/2008 |
| WO | WO-2010041440 A1 | 4/2010 |
| WO | WO-2010098146 A1 | 9/2010 |
| WO | WO-2010148597 A1 | 12/2010 |
| WO | WO-2014020407 A1 | 2/2014 |

OTHER PUBLICATIONS

Ericsson, et al., "Proposal for a SaMOG phase 2 solution", 3GPP Draft, S2-122712 Samog Second Phase Solution, 3rd Generation Partnership-Project (3GPP), Mobile Competence Centre, 658, Route Des Lucioles, F-06921 Sophia-Antipolis Ceoex, France, vol. SA WG2, no. Barcelona. Spain, Jul. 3, 2012 (Jul. 3, 2012), XP050633245, [retrieved on Jul. 3, 2812] the whole document.

ETSI TS 123 402 V10.8.0, "Universal Mobile Telecommunications System (UMTS)"., LTE, Architecture enhancements for non-3GPP accesses (3GPP TS 23.402 version 10.8.0 Release 10), Technical Specification, European Telecommunications Standards Institute(ETSI), 650, Route Des Lucioles, F-86921 Sophia-Antipolis ; France, Sep. 1, 2012 (Sep. 1, 2012), XP014075179, vol. 3GPP SA 2. No. V10.8.0, pp. 84.

Huawei, et al., "Principle of Handover Between 3GPP and Non-3GPP Access for Multiple PDNs", 3GPP Draft, S2-082225 Principle of Handover Between 3GPP and Non-3GPP Access for Multiple PDNS, 3rd Generation Partnership Project (3GPP), Mobile Competence Centre, 650, Route Des Lucioles, F-06921 Sophia-Antipolis Cedex, France, vol. SA WG2, no. Jeju, Apr. 1, 2008, Apr. 1, 2008 (Apr. 1, 2008), XP050264585 [retrieved on Apr. 1, 2008].

International Search Report and Written Opinion—PCT/US2013/061156—ISA/EPO—dated May 30, 2014.

LG Electronics, et al., "Proposed architectural requirements for OPIIS" Jul. 15, 2011 (Jul. 15, 2011), 3GPP Draft, S2-113565 3421 WAS2585 Opiis Arch Reqs, 3rd Generation-Partnership Project (3GPP), Mobile Competence Centre, 650, Route Des Lucioles , F-06921 Sophia-Antipolis Cedex, France, XP050548935,[retrieved on Jul. 15, 2011] the whole document.

Gsma, "Recommendations for Minimal Wi-Fi Capabilities of Terminals", GSM Association Official Document TS.22, Version 1.0, Jun. 7, 2012, pp. 20-21.

Taiwan Search Report—TW102134413—TIPO—dated Mar. 13, 2015.

Taiwan Search Report—TW105106144—TIPO—dated Apr. 7, 2017.

Ericsson, et al., "SaMOG Phase 2 Merged Solution", 3GPP TSG SA WG2#95 S2-130139, Jan. 22, 2013, pp. 1-15, [retrieved on Nov. 10, 2017], Retrieved from the Internet: URL:http://www.3gpp.org/ftp/tsg_sa/WG2_Arch/TSGS2_95_Prague/Docs/S2-130139.zip.

Huawei, et al., "Discussion of P2P Link", 3GPP TSG SA WG2 Meeting #92 TD S2-123193, Jul. 12, 2012, pp. 1-3 [retrieved on Nov. 10, 2017], Retrieved from the Internet: URL: http://www.3gpp.org/ftp/tsg_sa/WG2_Arch/TSGS2_92_Barcelona/Docs/S2-123193.zip.

Huawei, et al., "Layer 3 Attach Trigger", 3GPP TSG SA WG2 Meeting #92 TD S2-122909, Jul. 3, 2012, pp. 1-6. [retrieved on Nov. 10, 2017], Retrieved from the Internet: URL: http://www.3gpp.org/ftp/tsg_sa/WG2_Arch/TSGS2_92_Barcelona/Docs/S2-122909.zip.

Huawei, et al., "Proposal for SaMOG Solution with Simple IPSec Tunnel", 3GPP TSG SA WG2 Meeting #92 S2-124315, Nov. 6, 2012, pp. 1-13 [retrieved on Nov. 10, 2017], Retrieved from the Internet: URL: http://www.3gpp.org/ftp/tsg_sa/WG2_Arch/TSGS2_94_New_Orleans/Docs/S2-124315.zip.

Zte, et al., "DHCP based Phase-2 Solution", SA WG2 Meeting #92 S2-123196, Jul. 13, 2012, pp. 1-12 [retrieved on Nov. 10, 2017], Retrieved from the Internet: URL: http://www.3gpp.org/ftp/tsg_sa/WG2_Arch/TSGS2_92_Barcelona/Docs/S2-123196.zip.

3rd Generation Partnership Project; Technical Specification Group Core Network and Terminals; Access to the 3GPP Evolved Packet Core (EPC) via Non-3GPP Access Networks; Stage 3, Release 11, 3GPP Standard; 3GPP TS 24.302, 3GPP, Mobile Competence Centre; 650, Route Des Lucioles; F-06921 Sophia-Antipolis Cedex; France, vol. CT WG1, No. V11.4.0, Sep. 17, 2012, pp. 1-61, XP050649411.

Samsung: "Indicating Mapcon Capability of Network to the UE," 3GPP Draft; S2-103356_MAPCON_CAP_IND_DP V3, 3rd Generation Partnership Project (3GPP), Mobile Competence Centre; 650, Route Des Lucioles; F-06921 Sophia-Antipolis Cedex; France, vol. Sa WG2, no. Brunstad; Aug. 24, 2010, XP050458429, 4 pages.

"3rd Generation Partnership Project; Technical Specification Group Services and System Aspects; IP flow mobility and seamless Wireless Local Area Network (WLAN) offload; Stage 2 (Release 11)" , 3GPP Standard; 3GPP TS 23.261, 3rd Generation Partnership

(56) References Cited

OTHER PUBLICATIONS

Project (3GPP), Mobile Competence Centre; 650, Route Des Lucioles; F-06921 Sophia-Antipolis Cedex; France, vol. SA WG2, No. V11.0.0, Sep. 17, 2012 (Sep. 17, 2012), pp. 1-22, XP050649116.

* cited by examiner

TRANSPORT OF CONTROL PROTOCOL FOR TRUSTED WLAN (TWAN) OFFLOAD

CLAIM OF PRIORITY UNDER 35 U.S.C. § 119

This application claims benefit of U.S. Provisional Patent Application Ser. No. 61/719,893, filed Oct. 29, 2012, which is herein incorporated by reference in its entirety, U.S. Provisional Patent Application Ser. No. 61/705,104, filed Sep. 24, 2012, which is herein incorporated by reference in its entirety, and U.S. Provisional Patent Application Ser. No. 61/705,034, filed Sep. 24, 2012, which is herein incorporated by reference in its entirety.

BACKGROUND

Field

Certain aspects of the present disclosure generally relate to wireless communications and, more particularly, to extended extensible authentication protocol (EAP) authorization procedures for establishment of PDN connections using new control protocols, as well as techniques for transporting the control protocol between the user equipment (UE) and the network entity.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

As the number of wireless subscribers accessing mobile data services and the number of applications using mobile data services continue to increase, mobile operators encounter the challenge of supporting traffic growth in their licensed spectrum.

SUMMARY

Certain aspects of the present disclosure provide methods, corresponding apparatuses, and computer program products for wireless communications by a user equipment (UE). The method generally includes providing an indication, when the UE decides to connect to a network via a wireless area network (WLAN), that the UE is capable of supporting multiple packet data network (PDN) connections and utilizing a control protocol for management functions over the WLAN to establish multiple PDN connections through the WLAN, wherein the WLAN is a trusted WAN (TWAN) with respect to a wireless wide area network (WWAN) operator.

Certain aspects of the present disclosure provide a method for wireless communications by a user equipment (UE). The method generally includes providing an indication, when the UE decides to connect to a network via a wireless area network (WLAN), that the UE is capable of supporting multiple packet data network (PDN) connections or capable of supporting single connection (PDN or NSWO connection); receiving an indication as a response from the network that the WLAN supports single connection (PDN or NSWO connection) for the UE; and establishing at least one of a PDN or NSWO connection through the WLAN based on the response from the network via EAP authentication procedures in a manner that preserves IP continuity of the PDN connection.

Certain aspects of the present disclosure provide a method for wireless communications by a user equipment (UE). The method generally includes providing an indication, when the UE decides to connect to a network via a wireless area network (WLAN), that the UE is capable of supporting multiple packet data network (PDN) connections and establishing multiple PDN connections through the WLAN via one or more PDN connectivity establishment procedures in a manner that preserves IP continuity of the PDN connections as before the decision to connect if a response indicating the WLAN supports multiple PDN connections is received by the UE.

Certain aspects of the present disclosure provide a method for wireless communications by a wireless local area network (WLAN) entity. The method generally includes receiving an indication, when a user equipment (UE) decides to connect to a network via the WLAN, that the UE is capable of supporting multiple packet data network (PDN) connections and establishing multiple PDN connections through the WLAN via one or more PDN connectivity establishment procedures in a manner that preserves IP continuity of the PDN connections as before the decision to connect.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain aspects of the present disclosure provide a method for wireless communications. The method generally includes utilizing a control protocol to establish multiple packet data network (PDN) connections through a trusted wide area network (TWAN). Multiple PDN connections, concurrent Non-Seamless Wireless LAN Offload (NSWO) and PDN connections, and IP preservation for PDN connections during handover may be achieved in certain embodiments. Certain aspects of the present disclosure provide a method for wireless communications. The method generally includes offloading traffic from a WWAN to expand network coverage. WLAN offload may be used to extend capacity and provide better user experiences in accordance with certain aspects of the present disclosure. Multiple PDN connections and IP preservation during handover may be achieved in certain embodiments.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
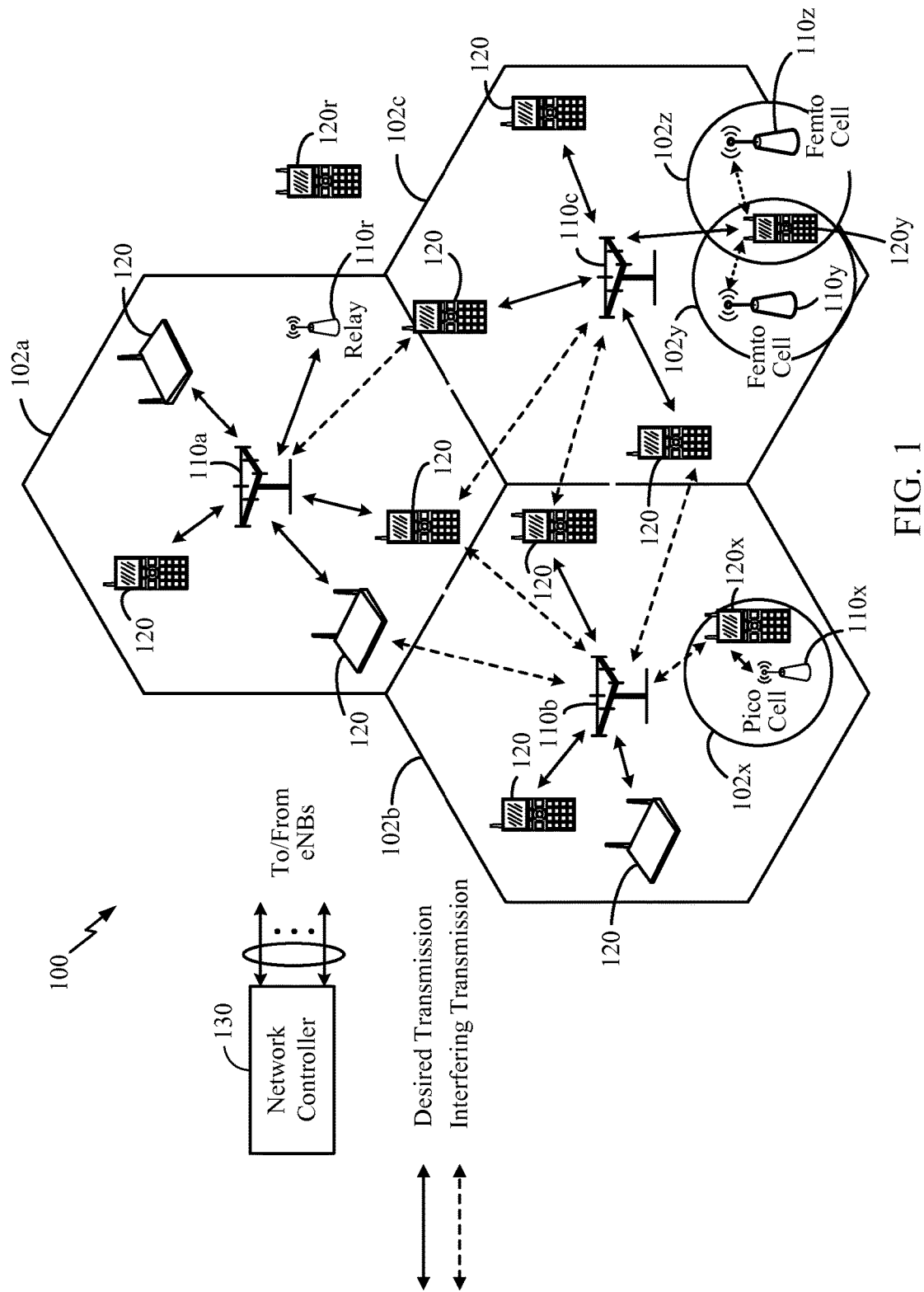
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120*r* in order to facilitate communication between eNB 110*a* and UE 120*r*. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.4, 3, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.4, 3, 5, 10, or 20 MHz, respectively.

Figure 2:
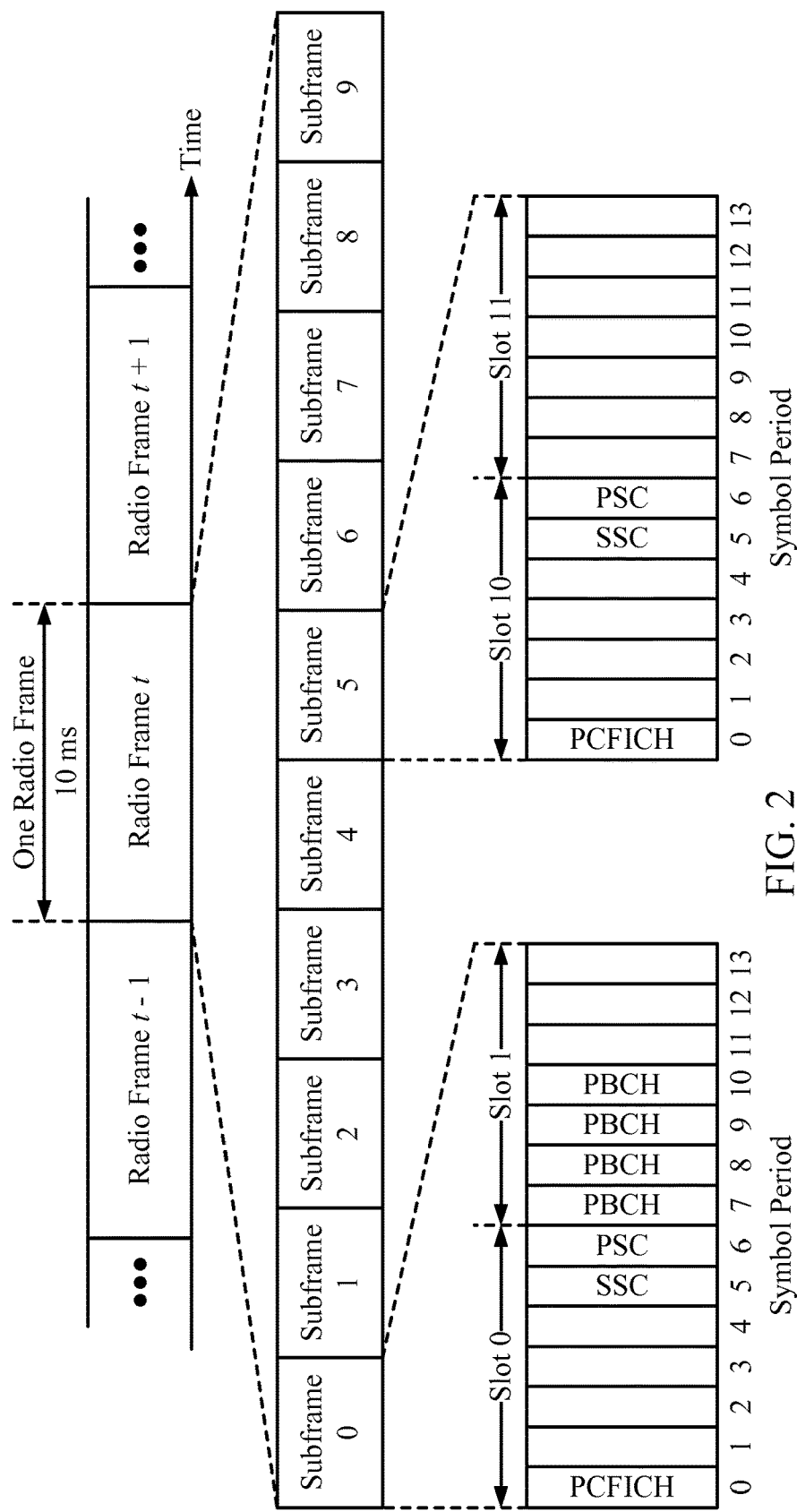
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
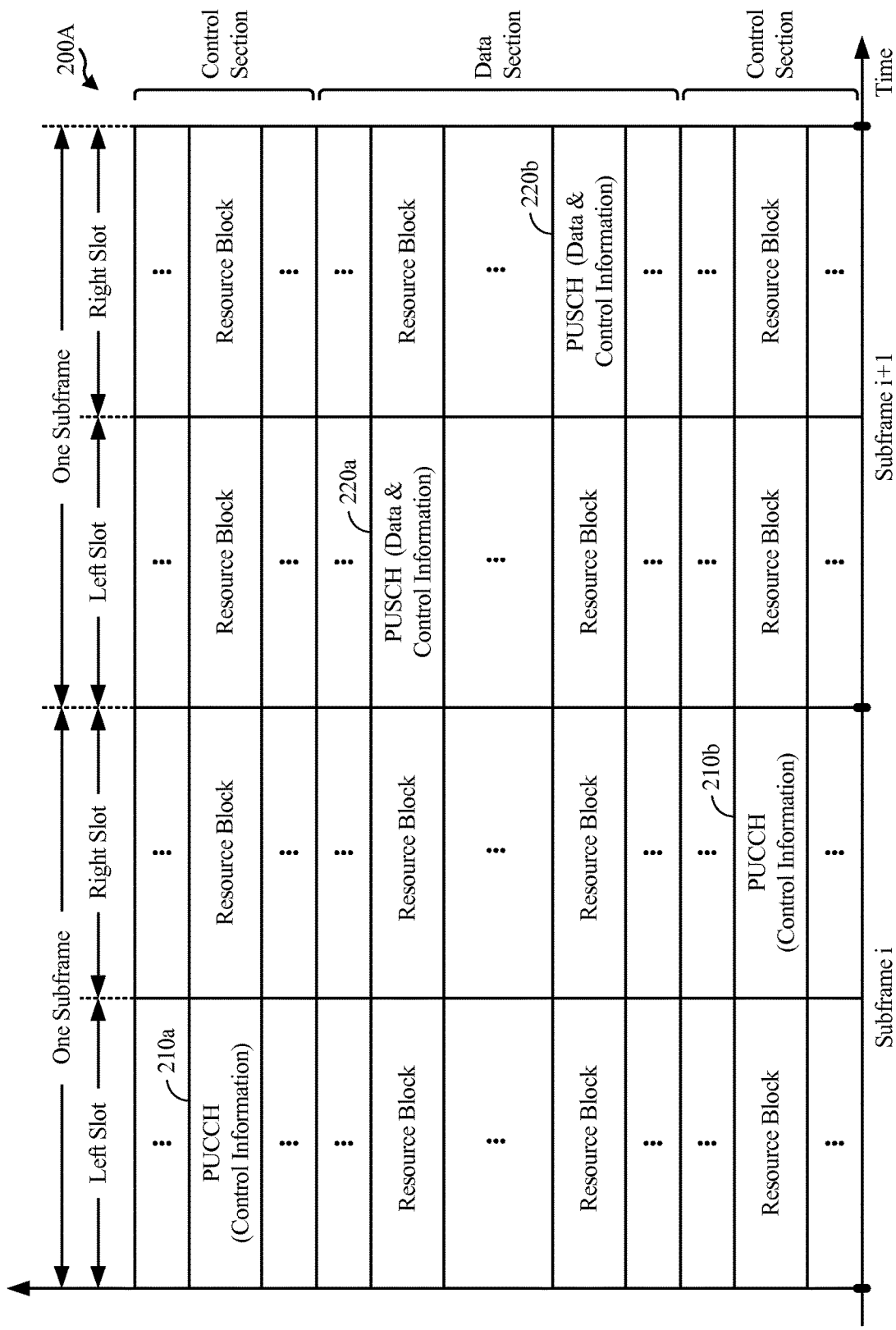
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 3:
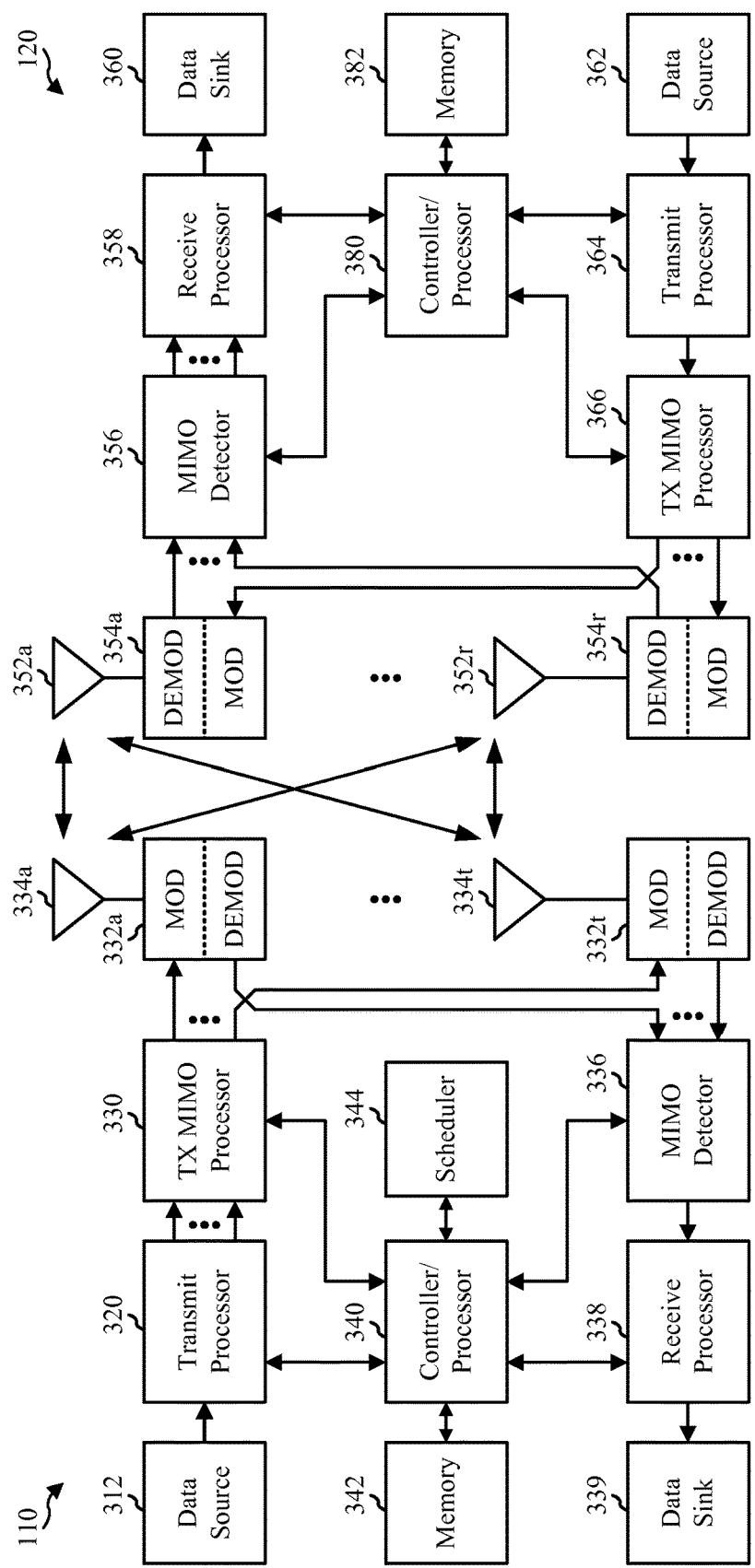
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Example Techniques for WiFi Offload Through Trusted WLAN Access

As the number of wireless subscribers accessing mobile data services and the number of applications using mobile data services continue to increase, mobile operators encounter the challenge of supporting traffic growth in their licensed spectrum. One approach to expand network capacity is to offload certain traffic to a wireless local area network (WLAN). Certain standards bodies (e.g., 3GPP standards body) are working on defining methods to offload traffic from wireless wide area network (WWAN) to WLAN. One of the scenarios is WLAN offload through operator deployed WiFi hotspot (denoted SaMOG for "S2a Mobility based On GTP (general packet radio service (GPRS) tunneling protocol)"). Unfortunately, existing standards (e.g., 3GPP Rel-11 SaMOG) only support a single packet data network (PDN) connection.

According to current standards (e.g., Rel-11) SaMOG may have various features and/or limitations. One example feature/limitation may be PDN connection to a default access point name (APN) over WLAN (without internet protocol (IP) preservation) with a per user equipment (UE) point-to-point link between a UE and a trusted wireless access gateway (TWAG). In Rel-11 SaMOG, Layer 2 may be triggered by extensible authentication protocol (EAP) authentication (e.g., trusted WAN (TWAN) triggered PDN connection setup). Alternatively, in Rel-11 SaMOG, Layer 3 may be triggered by dynamic host control protocol (DHCP) (e.g., UE-triggered PDN connection setup).

Certain features, such as handover between the TWAN and 3GPP access with IP address preservation, connectivity to a non-default APN, UE-initiated connectivity to additional PDNs, and concurrent non-seamless wireless offload (NSWO) and evolved packet core (EPC) access may not be supported by Rel-11 SaMOG.

Thus, approaches to expand network capacity by WLAN offload are desirable. For example, a solution, backward compatible with Rel-11, that supports IP preservation, ability to connect to non-default APN and multiple PDN connections, concurrent non-seamless wireless and interworking WLAN, and ability to differentiate PDN connections is desirable.

Techniques and apparatus are provided herein for wireless offload, supporting multiple PDN connections for wireless offload while maintaining IP preservation and also retaining backward compatibility with prior (e.g., pre-Rel-12) solutions. These techniques may reduce UE implementation complexities and may provide for standards-compliant products (e.g., long-term evolution (LTE) Rel-12 SaMOG compliant products). The techniques may require no change to current DHCP running on high level operating system (HLOS) on an application processor (AP).

As will be described in greater detail below, the techniques may involve a new control protocol for establishing PDN connections. According to certain aspects, the new control protocol may run on a modem. This approach may eliminate the need for a UE to remember the PDN connection that uses DHCP to get IP address(es). This approach may also avoid UE complexities, provide forward compatibility, and support IPv6 only bearer cases.

Multiple WLAN offload scenarios are possible. One example is interworking WLAN with WWAN (IWLAN). According to certain aspects, WLAN may be used to access EPC and allow mobility between WLAN and WWAN. In this example, IP continuity can be maintained during handover (HO) between WLAN and WWAN. In addition, simultaneous access to multiple access point names (APN) over WLAN may be supported. Multiple PDN connections over WLAN and WWAN concurrently may also be supported (which may referred to as multiple access PDN connectivity (MAPCON)). For example, traffic of operator applications over a WLAN connection and IP multimedia subsystem (IMS) traffic over a concurrent WWAN connection. In such cases, granularity may be at all PDN connections for a given APN. Dual radio (e.g., one for WLAN and the other for WWAN) may be used for concurrent connectivity. For certain aspects, local breakout may be used. The WLAN may be used to directly access the Internet without going through the EPC (e.g., Internet traffic may to the Internet APN while over WWAN).

According to certain aspects, there may be various EPC access options, which may depend on whether a WLAN is trusted or untrusted—which in turn may depend on whether a WiFi hotspot is operator-owned and on security policies of the hotspots.

Figure 4:
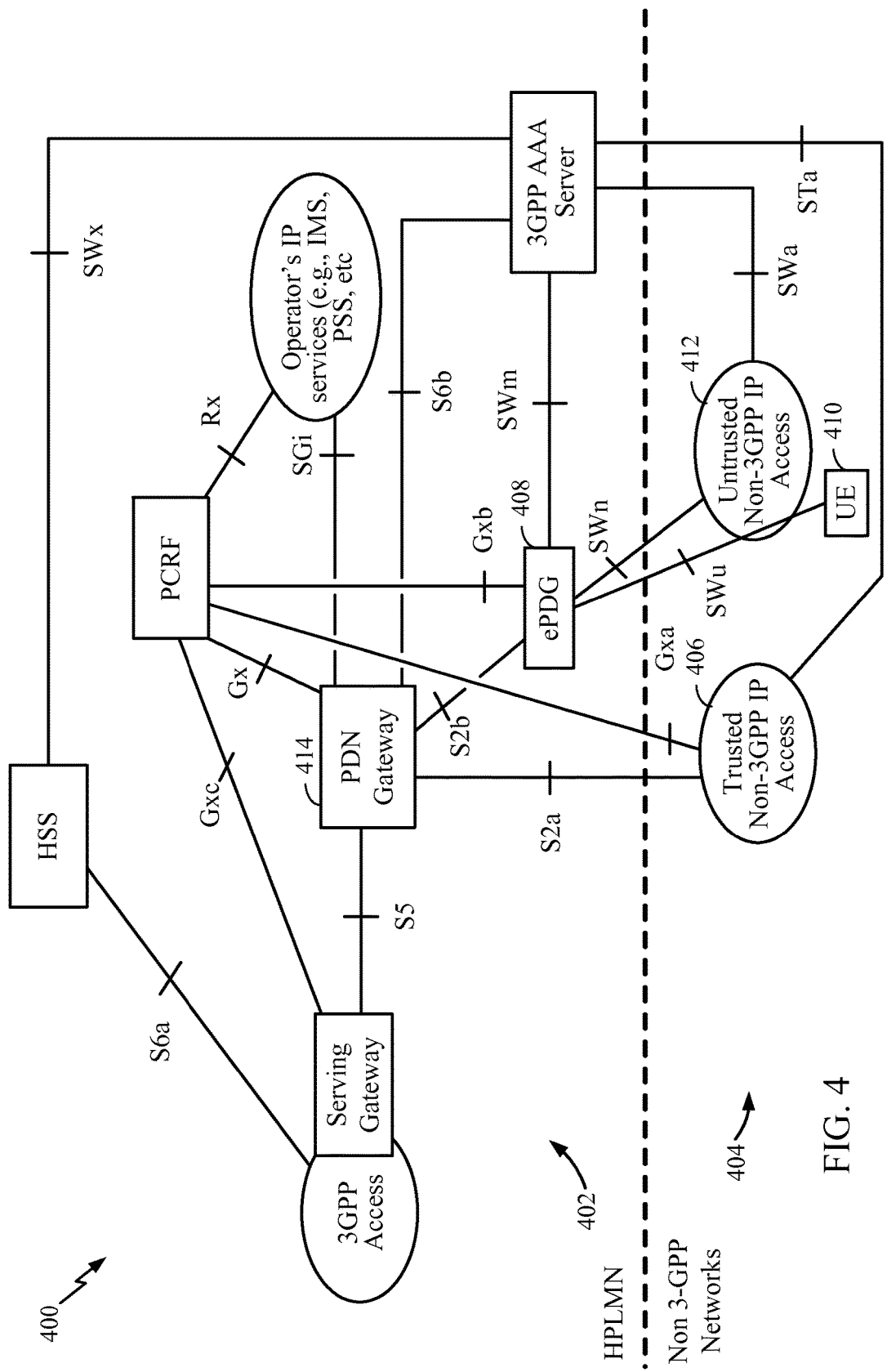
FIG. 4 illustrates an example non-roaming evolved packet service (EPS) wireless network architecture using S5, S2a, and S2b for IWLAN and EPC access, in accordance with certain aspects of the present disclosure.

FIG. 4 illustrates an example non-roaming evolved packet service (EPS) wireless network architecture 400 using S5, S2a, and S2b for IWLAN and EPC access, in accordance with certain aspects of the present disclosure. As shown, a portion of the network 400 may be home public land mobile network (HPLMN) 402 and a portion of the network may be comprised of non-3GPP networks 404.

According to certain aspects, IWLAN options may include S2a, S2b, and S2c. S2a may provide trusted WLAN access using general GTP as shown in FIG. 4. In the S2a solution, because the WLAN access may be considered a trusted connection 406, an evolved packet data gateway (ePDG) 408 or an IPsec tunnel may be unused for this option. Instead, connectivity is managed by the UE 410 selecting and connecting to the WLAN, and then exchanging signaling with the WLAN access network in order to establish connectivity with the EPC.

In another option, S2b may be used for untrusted WLAN access 412, also as shown in FIG. 4. In the S2b solution, a UE 410 establishes PDN connections over WLAN to an EPC. Since the WLAN access 412 is untrusted, ePDG 408 mediates communication between the UE 410 and the PDN gateway 414. In some instances, the UE 410 may tunnel control and user plane data to the ePDG 408 by establishing Internet protocol security (IPSec) tunnels between the UE 410 and ePDG 408. In turn, the ePDG establishes GTP or proxy mobile Internet protocol (PMIP) tunnels to the appropriate PDN gateway 414.

Although not shown in FIG. 4, S2c may also be used for trusted 406 or untrusted 412 WLAN access. If the WLAN access is untrusted 412, IPSec tunnels to the ePDG 408 may be used, whereas if the WLAN access is trusted 406, IPSec tunnels may be unused. In the S2c solution, the UE 410 may connect directly to the PDN gateway 414 using Dual Stack Mobile IP (DSMIP).

Figure 5:
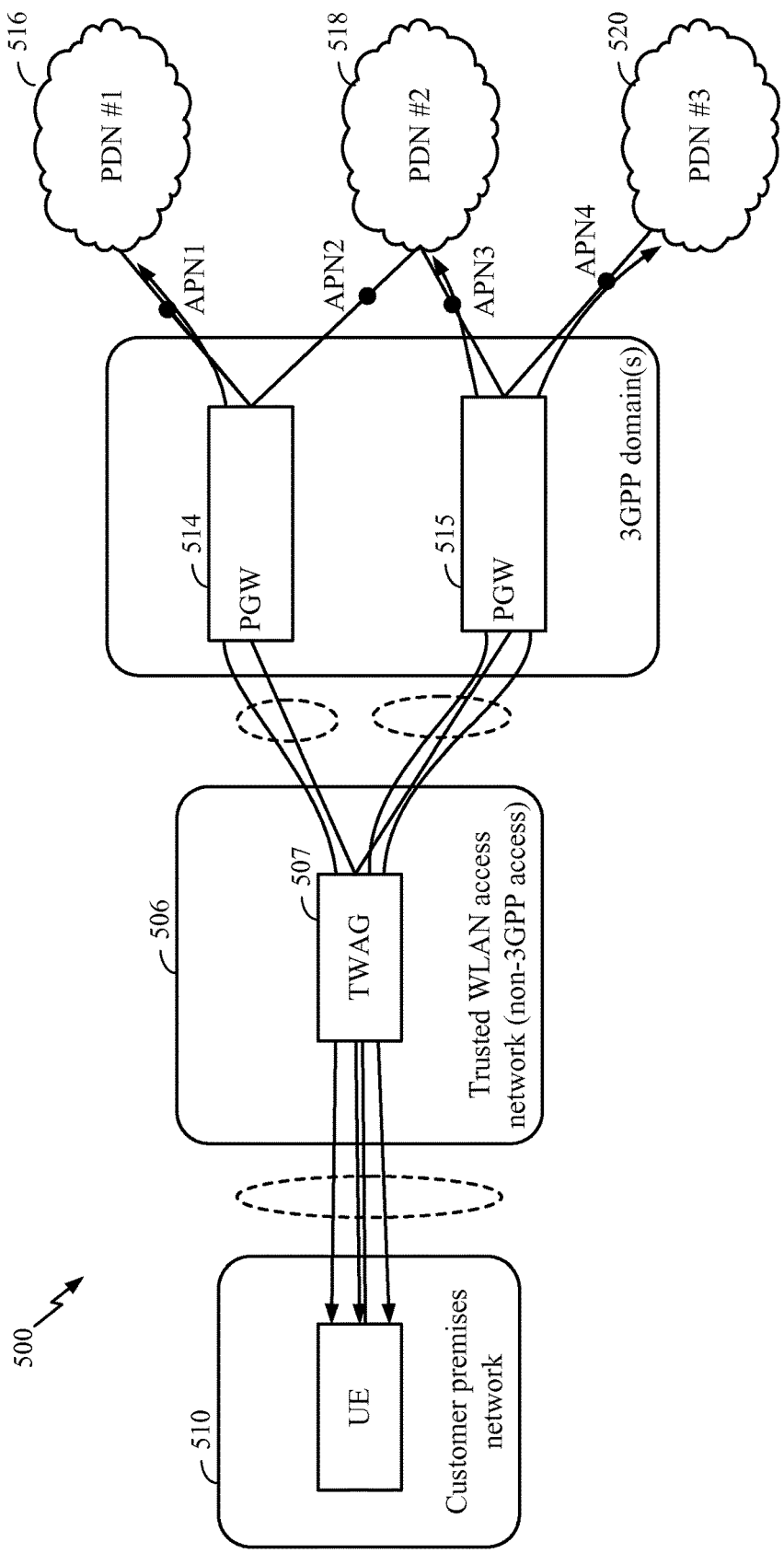
FIG. 5 illustrates a network architecture 500 for S2a-based solutions, including a trusted WLAN access network.

FIG. 5 illustrates a network architecture 500 for S2a-based (e.g., SaMOG based) solutions, including a trusted WLAN access network 506 (e.g., similar to trusted WLAN access network 406). Trusted WLAN access network 506 may include TWAG 507. As shown in FIG. 5, a PDN gateway (PGW) 514, 515 (e.g., similar to PDN gateway 414) may access multiple PDNs (e.g., PDN #1 516, PDN #2 518, PDN #3 520).

Figure 6:
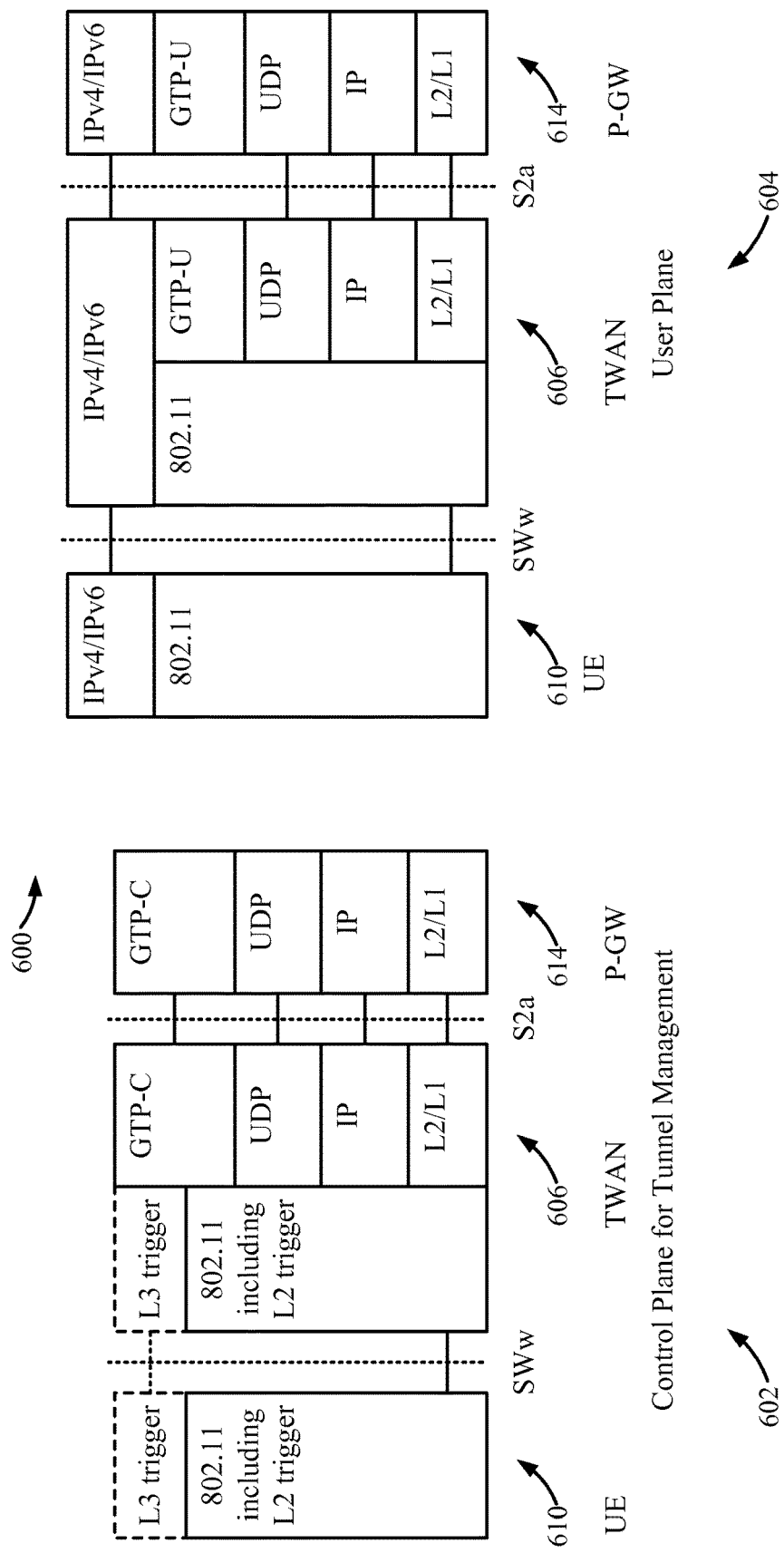
FIG. 6 illustrates a control plane for tunnel management 600 and a user plane 650 in a trusted WLAN access gateway (TWAG) system.

FIG. 6 illustrates a control plane for tunnel management 602 and a user plane 604 in a trusted WLAN access gateway (TWAG) system 600 (e.g., similar to trusted access 406, 506). As shown in FIG. 6, traffic to/from UE 610 (e.g., similar to UE 510) may travel via S2a between TWAN 606 (e.g., similar to TWAN 506) and PGW 614 (e.g., similar to PGWs 514, 515). TWAN 606 may route the traffic to the PGW 614.

Figure 7:
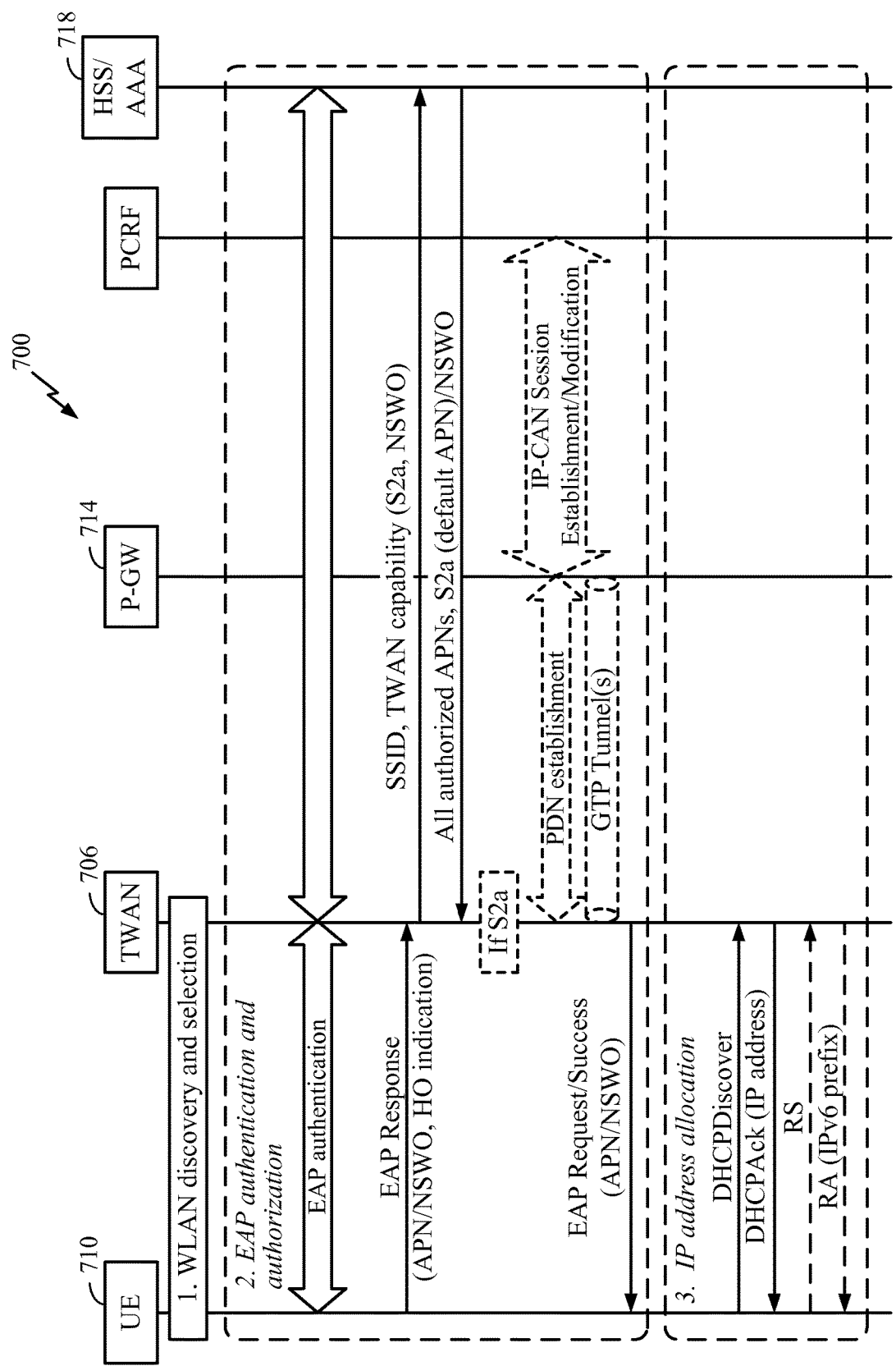
FIG. 7 illustrates an example call flow 700 for control protocol that can achieve IP continuity/preservation concerning a single connection, either PDN or NSWO.

FIG. 7 illustrates an example call flow 700 for a control protocol that may achieve IP continuity/preservation concerning a single connection (PDN or NSWO). As shown in FIG. 7, after WLAN discovery and selection at 1, EAP authentication may be performed, in 2, between the UE 710 and TWAN 706. In the example shown in FIG. 7, during EAP authentication procedures (2 in FIG. 7), the UE 710, the TWAN 706, and the 3GPP authentication, authorization and accounting (AAA) server 718 may determine whether trusted WLAN access to the EPC is supported. If a PDN connection is established via S2a, a GRE tunnel (or any other approaches to identify the PDN connection) shall not be used. S2a steps are shown with dotted lines in the figure.

After, the EAP authentication procedures, the UE 710 may send the TWAN 706 an EAP response. In order to achieve IP preservation in a WLAN offload procedure, vendor-specific "skippable" attributes with one or more information elements may be defined for the EAP response. In some implementations, the attribute included in the EAP response may include a HO indication and/or an APN name of the APN that the UE 710 is seeking to connect to as a first connection. According to certain aspects, NSWO may be defined as a specific APN name. Alternatively, the UE may provide an APN list of PDNs it has connected to over WWAN, and the network may choose one as the first connection.

According to certain aspects, HO indication may provide for IP preservation and indication of APN name may enable the UE to connect to non-default APN and multiple PDN connections. For example, if the handover is from a WWAN, the UE 710 may indicate HO in the EAP response (and may also include the APN name that it wants to transfer context as the first PDN) to the network. If the UE 710 does not indicate HO, then the EAP response indicates an initial connection request.

If the UE 710 specifies an APN name (or NSWO), the network replies with the selected APN name (or NSWO) for the first connection. If the UE 710 does not specify an APN name, the network replies with a default APN name for the first connection. The network may include the APN name in EAP signaling to the UE 710. For example, TWAN 706 may send EAP Request/Success signaling to the UE 710 in response to the EAP response and the EAP Request/Success may indicate the APN name or NSWO.

"Skippable" may mean a device that does not support a corresponding feature may simply ignore or skip that feature. Accordingly, the offload protocol 700 may continue as previously defined if either the UE 710 or the TWAN 706 do not support the skippable attribute. Because the attribute may be skippable, the approach shown in FIG. 7 may be backward compatible (e.g., with Rel-11) with UEs or networks that may not support the additional attribute. For example, if the UE 710 does not include the HO indication and APN name in EAP messaging (e.g., the UE does not support the additional attribute), then the process 700 may fallback to Rel-11. Further, even if the UE includes HO indication and/or APN name in EAP messaging but the network does not support the additional feature or include the APN name in EAP messaging, then the process 700 may also fallback to Rel-11.

As seen in FIG. 7, at 3, the UE 710 may then obtain an IP address or addresses through DHCP and router solicitation/router authentication (RS/RA). Vendor-specific DHCP options may be used to obtain operator reserved protocol configuration options (PCO).

The approach shown in FIG. 7 may involve new UE implementation. On the data path, the IP address may be moved between WWAN and WLAN adapter on the application processor (AP) in a seamless manner without applications knowing about it. If operator-reserved PCO is required, a vendor-specific DHCP option may be desirable, and if the first connection is PDN, DHCP may be used on the modem. In this case, it may be desirable for TWAN to support a vendor-specific DHCP option if operator-reserved PCO is used and may work with IPv4 only, IPv6 only, and IPv4v6 bearer cases.

Figure 8:
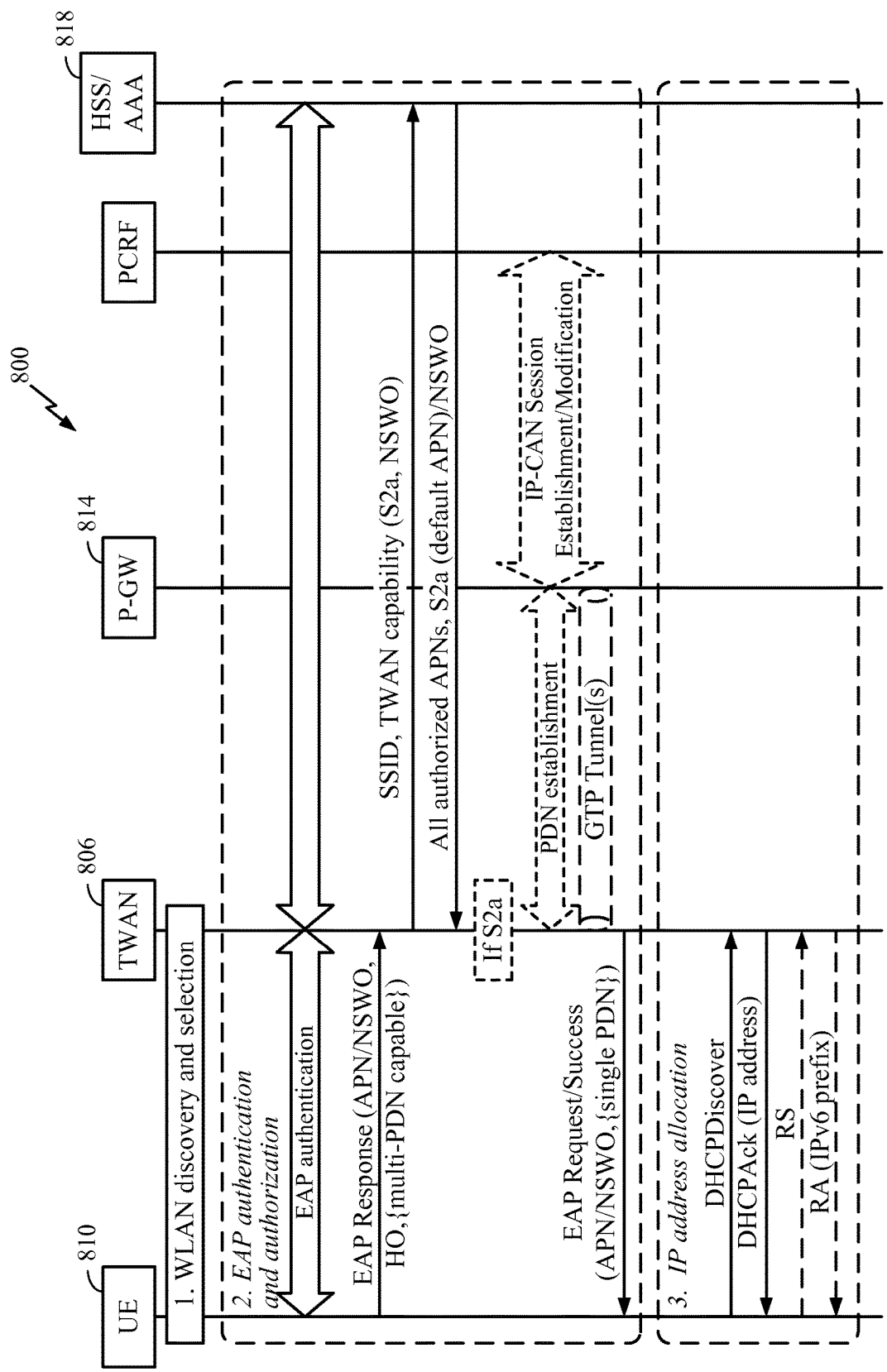
FIG. 8 illustrates a call flow 800 describing a use case concerning a single connection, either PDN or NSWO.

FIG. 8 illustrates a call flow 800 describing a use case concerning a single connection—either PDN or NSWO, in accordance with certain aspects of the present disclosure. As shown in FIG. 8, in addition to an indication of HO and APN/NSWO, the EAP response may be extended to also include an indication of the capability of the UE to support multiple PDN connections. For example, in the embodiment illustrated in FIG. 8, the UE 810 indicates in the EAP Response (in 2) that it is multi-PDN capable. In the network to UE direction, the network may send an indication of whether the first connection is APN or NSWO. "NSWO"

may indicate that the first connection is NSWO. If an APN name is received, it can be the APN the network connects to as the first connection.

As shown in the FIG. 8, the EAP Request/Success may be extended to also provide an indication of whether it supports a single connection (PDN/NSWO) or multi-PDN connection—with or without NSWO. For example, in the embodiment illustrated in FIG. 8, the TWAN 806 indicates in the EAP Request/Success message (in 2) that network support single PDN only.

The extended EAP signaling informs the network that the UE 710 supports multi-PDN and informs the UE that the network supports single PDN. FIG. 8 illustrates the backward compatibility with pre-Rel-11. In this case, DHCP and RS/RA are used to obtain an IP address for the first connection—PDN or NSWO.

Figure 9:
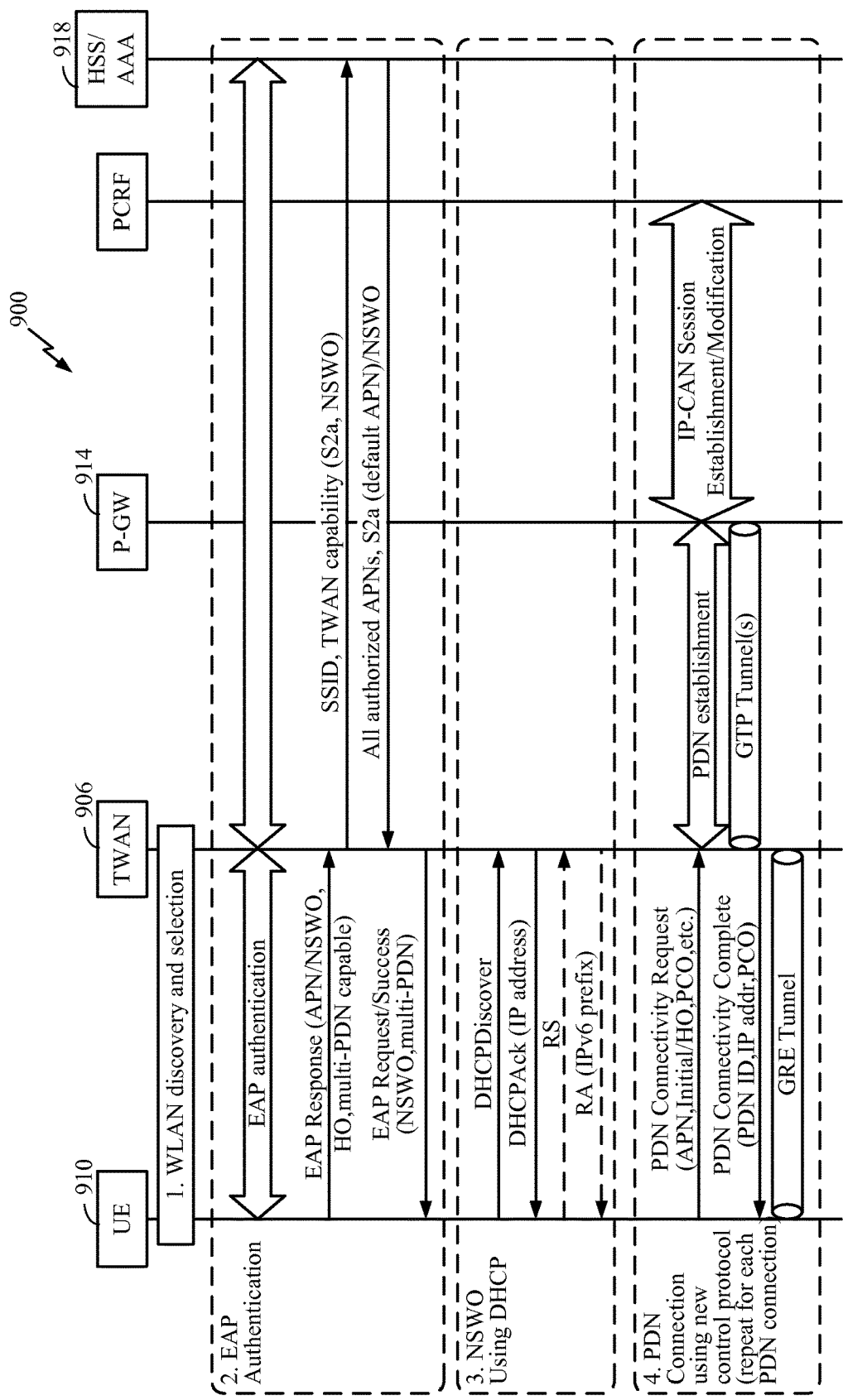
FIG. 9 illustrates a call flow 900 describing a use case concerning one or more PDNs with an NSWO.

FIG. 9 illustrates a call flow 900 describing a use case concerning one or more PDNs with an NSWO, in accordance with certain aspects of the present disclosure. As shown in FIG. 9, in 2, the UE 910 indicates the UE 910 support multi-PDN connections in the EAP Response and the network also indicates that it supports multiple PDN connections in the EAP Request/Success.

According to certain aspects, a control protocol to carry PDN related information elements may be used for setting up PDN connections. PDN connections may use link layer or network layer tunnels (e.g. GRE tunnels as shown in the call flows). In the UE to network direction, the control protocol—which may be a new control protocol or an enhancement of an existing protocol and which is not the standard DHCP—may signal an APN name, an indication of initial or handover, and a PCO. For example, the UE 910 may signal the information to the TWAN 906 in a PDN Connectivity Request message.

In the network to UE direction, the network may signal a PDN ID, IP address, and PCO to the UE 910. For example, TWAN 906 may signal the information to UE 910 in a PDN Connectivity Complete message.

The control protocol may be repeated for each PDN connection. User traffic may be transmitted over a tunnel (e.g. a GRE tunnel). In addition, IP address may be used to differentiate traffic when there are multiple PDNs. The new control protocols may include a new advertisement protocol over generic advertisement service (GAS).

According to certain aspects, a combination of a UE medium access control (MAC) address, PDN ID (e.g., GRE key), and UE IP address may uniquely identify a PDN connection. In cases where the HSS/AAA 918 returns a wildcard as the authorized APNs, the UE 910 and TWAN 906 may negotiate a PDN ID (e.g., GRE key).

Figure 10:
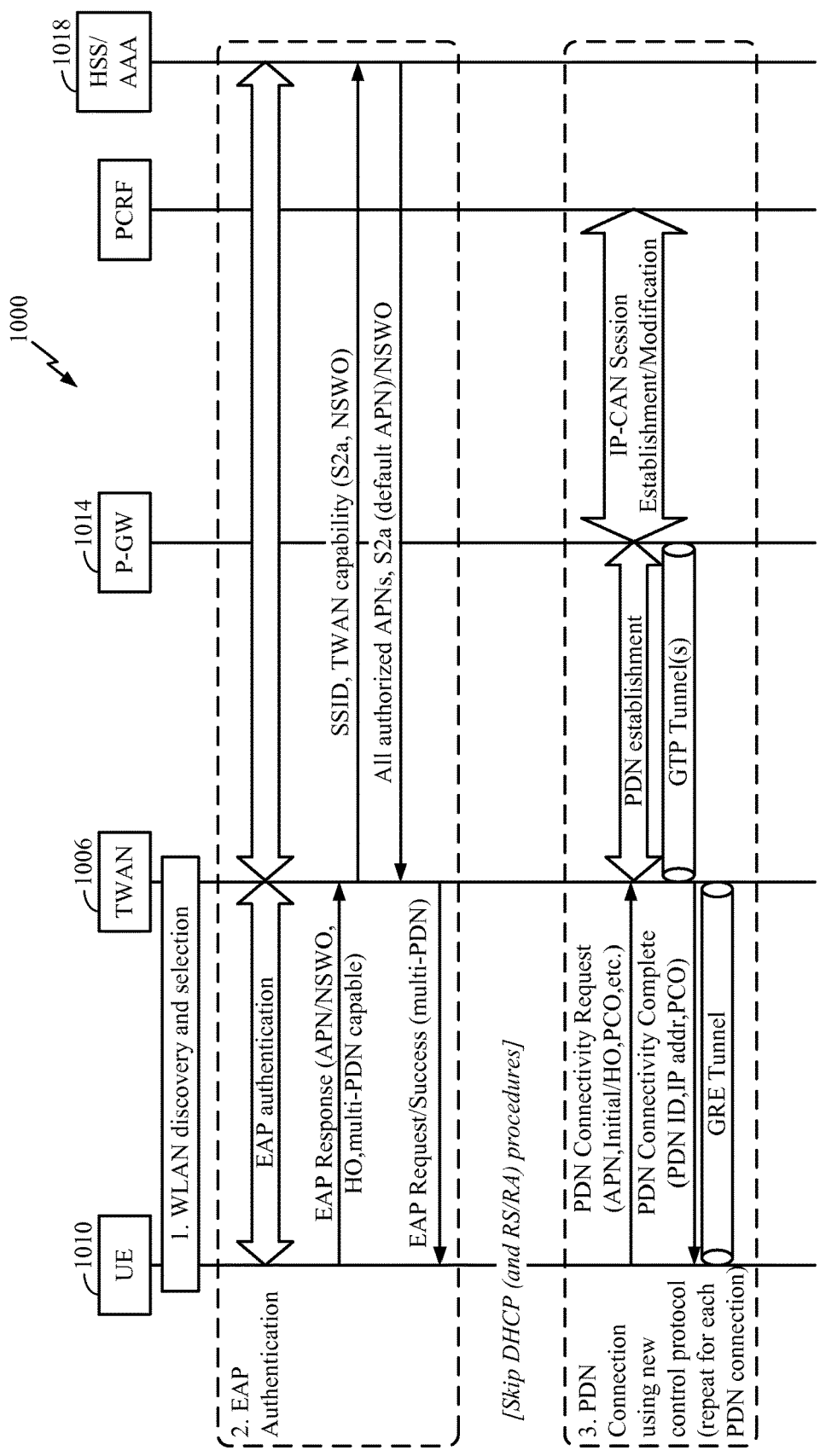
FIG. 10 illustrates a call flow 1000 describing a use case concerning multiple PDNs without an NSWO connection.

FIG. 10 illustrates a call flow 1000 describing a use case concerning multiple PDNs without an NSWO connection, in accordance with certain aspects of the present disclosure. Call flow 1000 illustrates a UE 1010 first performs WLAN discovery and selection, and then, after the selection, an EAP authentication and authorization procedure is performed between the UE 1010 and TWAG 1006. As shown in FIG. 10, since the network indicates multi-PDN scenario, but does not specify NSWO during EAP authentication procedures, the standard DHCP and/or RS/RA procedures used for NSWO IP address(es) assignment may be skipped. The control protocol may be the same as for the case concerning one or more PDNs with an NSWO illustrated in FIG. 8 at 4.

The techniques illustrated in FIGS. 7-10 may support single-connection PDN/NSWO, while retaining backward compatible with pre-Rel-12 techniques (e.g., as shown in FIG. 7). If multiple connections are supported, if NSWO is allowed by operator policy, it may be the first connection (e.g., as shown in FIG. 9). DHCP and RS/RA may be used to get IP address(es). Alternatively, if NSWO is not allowed, DHCP and RS/RA procedures may be skipped (e.g., as shown in FIG. 10). New control protocol procedures may be used to establish or release PDN connections.

The techniques may support multiple PDN connections and NSWO concurrently without requiring change to current DHCP and RS/RA which may run on HLOS on an application processor. The control protocol described herein may be used to establish one or more PDN connections and may run on a modem. The techniques may eliminate the need for a UE to remember the PDN connection that uses DHCP to get IP address(es), thereby avoiding UE complexities. The techniques may also be forward compatible with "to be established" standardized techniques, for example, by support IPv6 only bearer cases, which typically cannot be supported with current DHCP and RS/RA. Certain embodiments of the present disclosure may provide advantages over existing systems. Multiple PDN connections may be established concurrently with an NSWO connection. New control protocols may be used for PDN connections. The present disclosure may be backward compatible with 3GPP Rel-11 S2a-based mobility over GTP (SaMOG) and forward compatible with new releases. Another advantage is IP address preservation. Still another advantage includes concurrent NSWO and EPC access. Yet another advantage is UE-initiated connectivity to additional PDNs.

Figure 11:
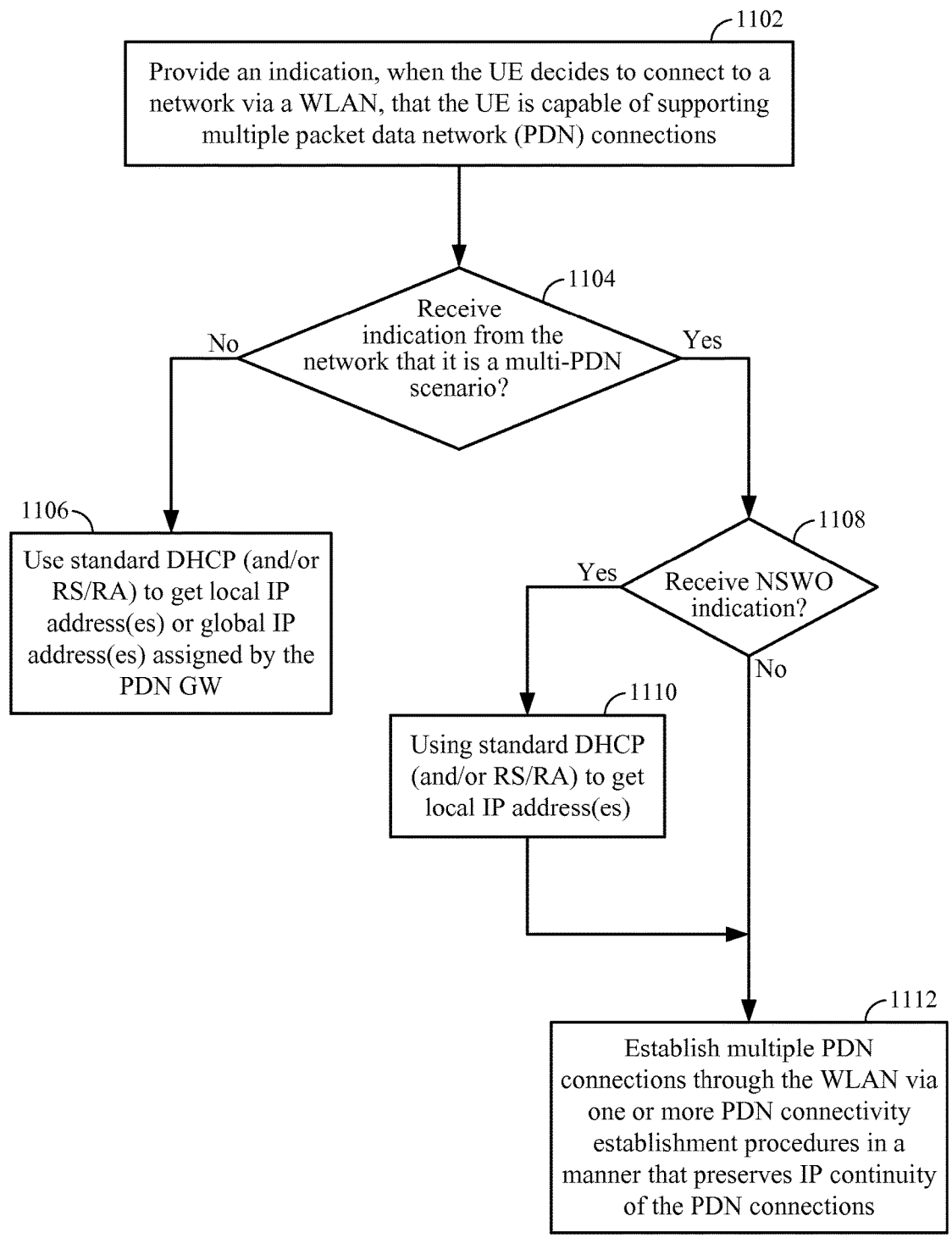
FIG. 11 illustrates example operations that may be performed by a user equipment (UE), in accordance with aspects of the present disclosure.

FIG. 11 illustrates example operations 1100 that may be performed, for example, by a UE, in accordance with aspects of the present disclosure. The operations 1100 may begin, at 1102, by providing an indication, when the UE decides to connect to a network via a WLAN, that the UE is capable of supporting multiple packet data network (PDN) connections. If the UE does not receive an indication from the network that it is a multi-PDN scenario, as determined at 1104, the UE uses standard DHCP (and/or RS/RA) procedures to get local IP address(es) assigned by the PDN Gateway.

If the UE receives an indication from the network that it is a multi-PDN scenario, as determined at 1104, and also an indication of NSWO, as determined at 1108, the UE uses standard DHCP (and/or RS/RA) procedures to get local IP address(es) at 1110 and establishes multiple PDN connections through the WLAN via one or more PDN connectivity establishment procedures in a manner that preserves IP continuity of the PDN connections, at 1112. If the UE does not receive an indication of NSWO, it skips operation 1110.

Figure 12:
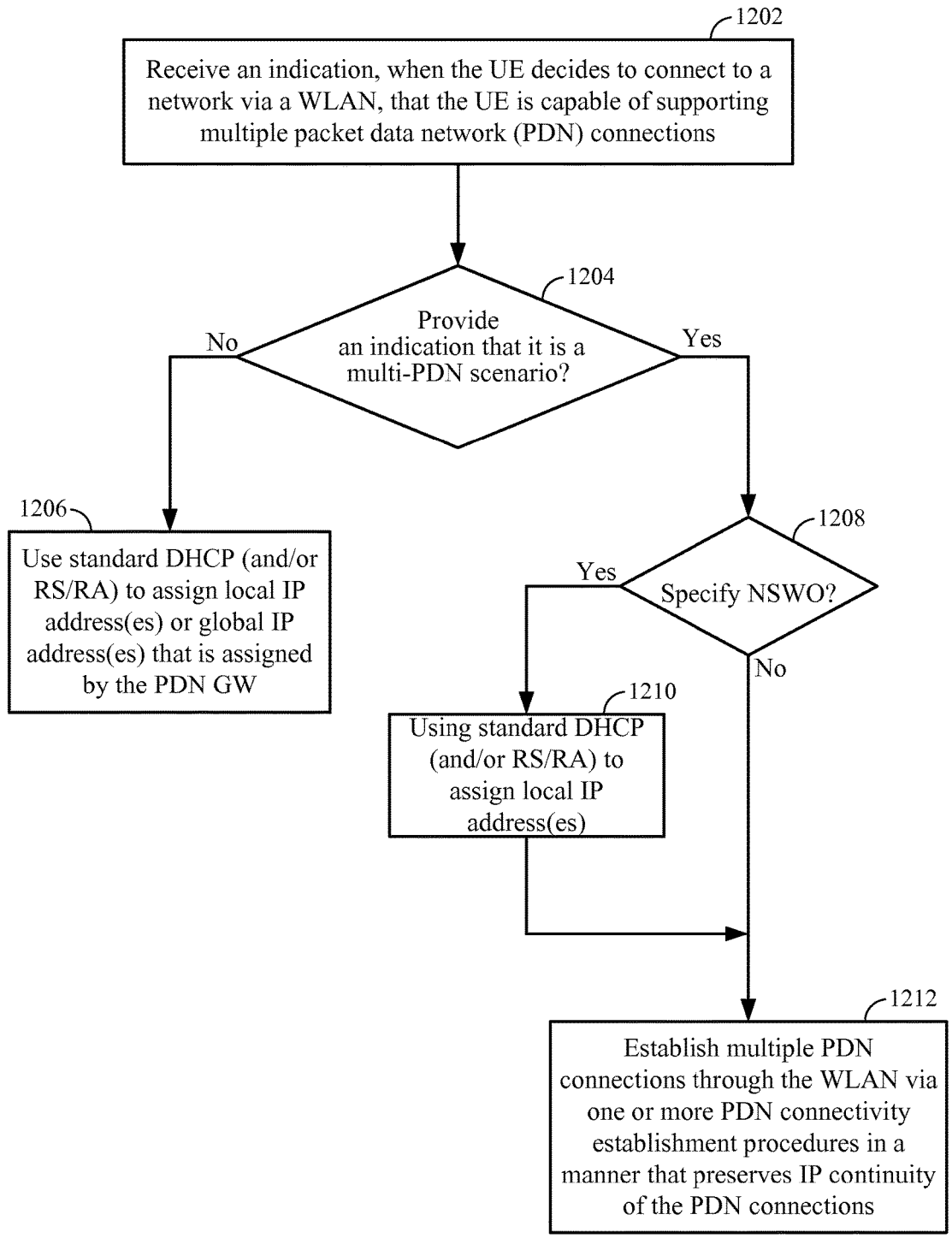
FIG. 12 illustrates example operations that may be performed by a WLAN entity, in accordance with aspects of the present disclosure.

FIG. 12 illustrates example operations 1200 that may be performed, for example, by an entity in a WLAN, in accordance with aspects of the present disclosure. The operations 1200 begin, at 1202, by receiving an indication, when a UE decides to connect to a network via a WLAN, that the UE is capable of supporting multiple packet data network (PDN) connections. If the entity does not provide an indication from the network that it is a multi-PDN scenario, as determined at 1204, the entity uses standard DHCP (and/or RS/RA) procedures to assign local IP address (es) (e.g., by the PDN Gateway).

If the entity provides an indication that it is a multi-PDN scenario, as determined at 1204, and also NSWO is specified, as determined at 1208, the entity uses standard DHCP (and/or RS/RA) procedures to assign local IP address(es) at 1210 and establishes multiple PDN connections through the WLAN via one or more PDN connectivity establishment procedures in a manner that preserves IP continuity of the PDN connections, at 1212. If the NSWO is not specified, it skips operation 1210.

Transport of Control Protocol for Trusted WLAN Offload

As discussed above, supporting multiple packet data network (PDN) connections, concurrent PDN and non-seamless wireless offload (NSWO) connections, and IP preservation during handover between wireless wide area networks (WWAN) and wireless local area networks (WLAN) may be desirable. Techniques for wireless offload through trusted WLAN (TWAN) were discussed above including a new control protocol.

One issue to be addressed is the transport of the control protocol for PDN connection management between the user equipment (UE) and TWAN, as shown above in FIGS. 7-12.

Three approaches are provides herein for the transport of control protocol for PDN connection management between the UE and TWAN. The first solution involves control protocol over generic routing encapsulation (GRE) using a dedicated GRE tunnel between the UE and TWAN for transport of the control protocol. The second solution involves transporting control protocol over Internet protocol (IP). And the third solution involves transport of control protocol over a generic advertisement service (GAS).

Figure 13:
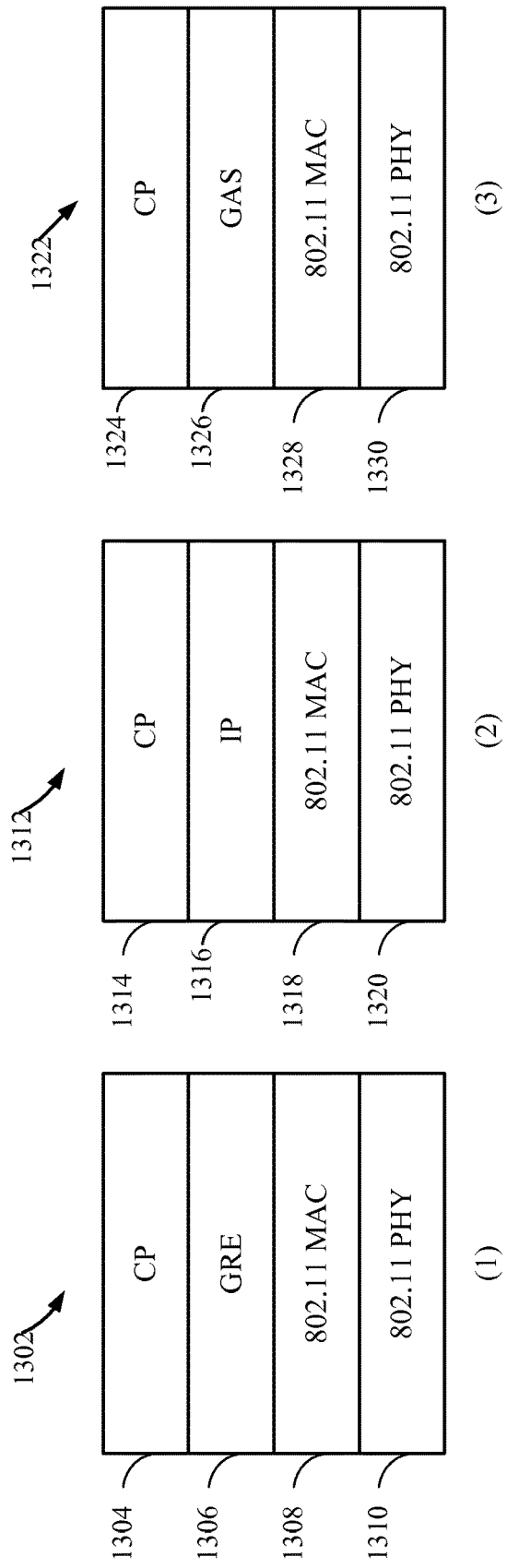
FIG. 13 illustrates protocol stacks for three example approaches to control plane transport, in accordance with aspects of the present disclosure.

FIG. 13 illustrates protocol stacks for the three example approaches to control plane transport. According to a first embodiment 1302, control protocol 1304 is transported over a dedicated GRE tunnel 1306 (or a virtual LAN (VLAN)) between a UE and a TWAN, over MAC 1308, over PHY 1312. According to a second embodiment 1312, a control protocol 1314 is transported over Internet protocol (IP), 1316 over MAC 1318, over PHY 1320. In the third embodiment 1322, control protocol 1324 is transported over GAS 1326, over MAC 1328, over PHY 1330.

A number of example call flows are illustrated in the following figures. The techniques illustrated in one or more of these call flows may support multiple PDN connections, concurrent NSWO and PDN connections, and/or IP preservation for PDN connections, and transport of control protocol according to the three approaches.

Figure 14:
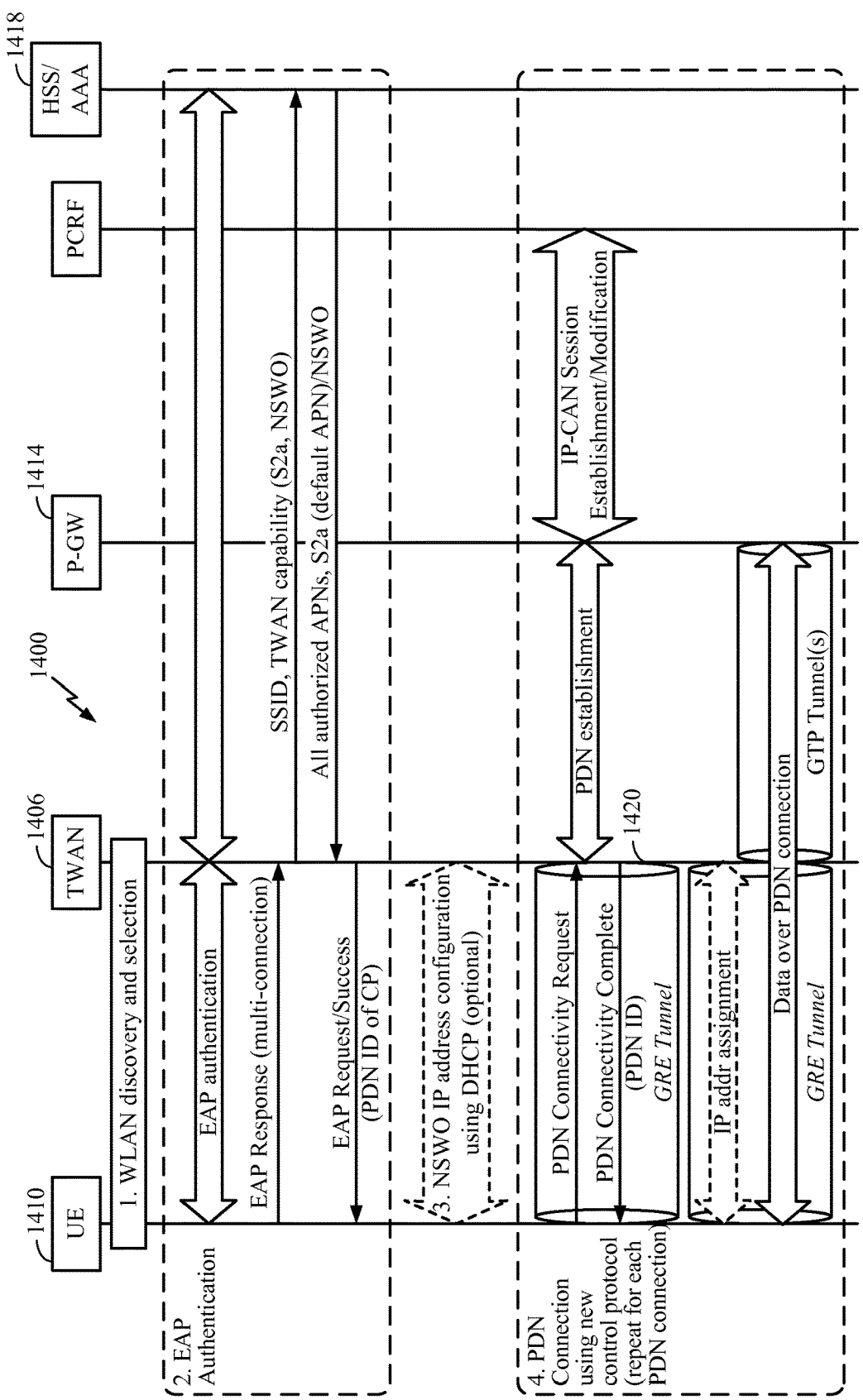
FIG. 14 illustrates a call flow 800 describing one example approach of control protocol over Generic Routing Encapsulation (GRE), in accordance with aspects of the present disclosure.

FIG. 14 illustrates an example call flow 1400 according to the first example approach for control protocol over GRE, over MAC, while achieving IP continuity/preservation, using multiple PDN connections established by control protocol utilizing a dedicated GRE tunnel 1420. Call flow 1400 can use extensible authentication protocol (EAP) for authentication. This call flow can be extended to other layer 2 approaches, e.g., VLAN can be used instead of the GRE tunnel 1420 (correspondingly the GRE key can be replaced by VLAN ID).

As described above, EAP can be extended to indicate additional attributes. As shown in FIG. 14, in 2, after the UE 1410 selects a network to connect with via WLAN, the UE 1410 may send an EAP Response message that includes an indication that the UE 1410 is capable of supporting multiple PDN connections. Control protocol for establishing PDN connections, in 3, may utilize one or more link layers or network layer tunnels, e.g., GRE or VLAN, for link layer tunneling.

In some embodiments, the UE 1410 may request a PDN ID (e.g., a GRE key) to identify the link layer tunnel carrying the control protocol. The link layer tunnel may be a dedicated GRE tunnel 1420. For example, the UE 1410 may use extended EAP, in 2, to obtain a PDN ID (e.g., GRE key) for the control protocol. According to some embodiments, PDN IDs may be obtained via static configuration of the UE 1410 or through DHCP procedures. In some embodiments, in 3, NSWO IP address may be configured using DHCP. As shown in FIG. 14, in 4, using the PDN ID (e.g., GRE key) obtained through extended EAP signaling, the UE 1410 may send a PDN Connectivity Request message to TWAN 1406 over the GRE tunnel 1420 to request a PDN connection. In response to the PDN Connectivity Request message, TWAN 1406 may send a PDN Connectivity Complete over the GRE tunnel 1420 which may indicate the PDN ID. After the PDN connection has been established, the data over this PDN connection may transferred over the GRE tunnel that was assigned during PDN establishment procedure.

The example approach shown in FIG. 14 may have the benefits of simplicity and consistency between the data and control plane.

Figure 15:
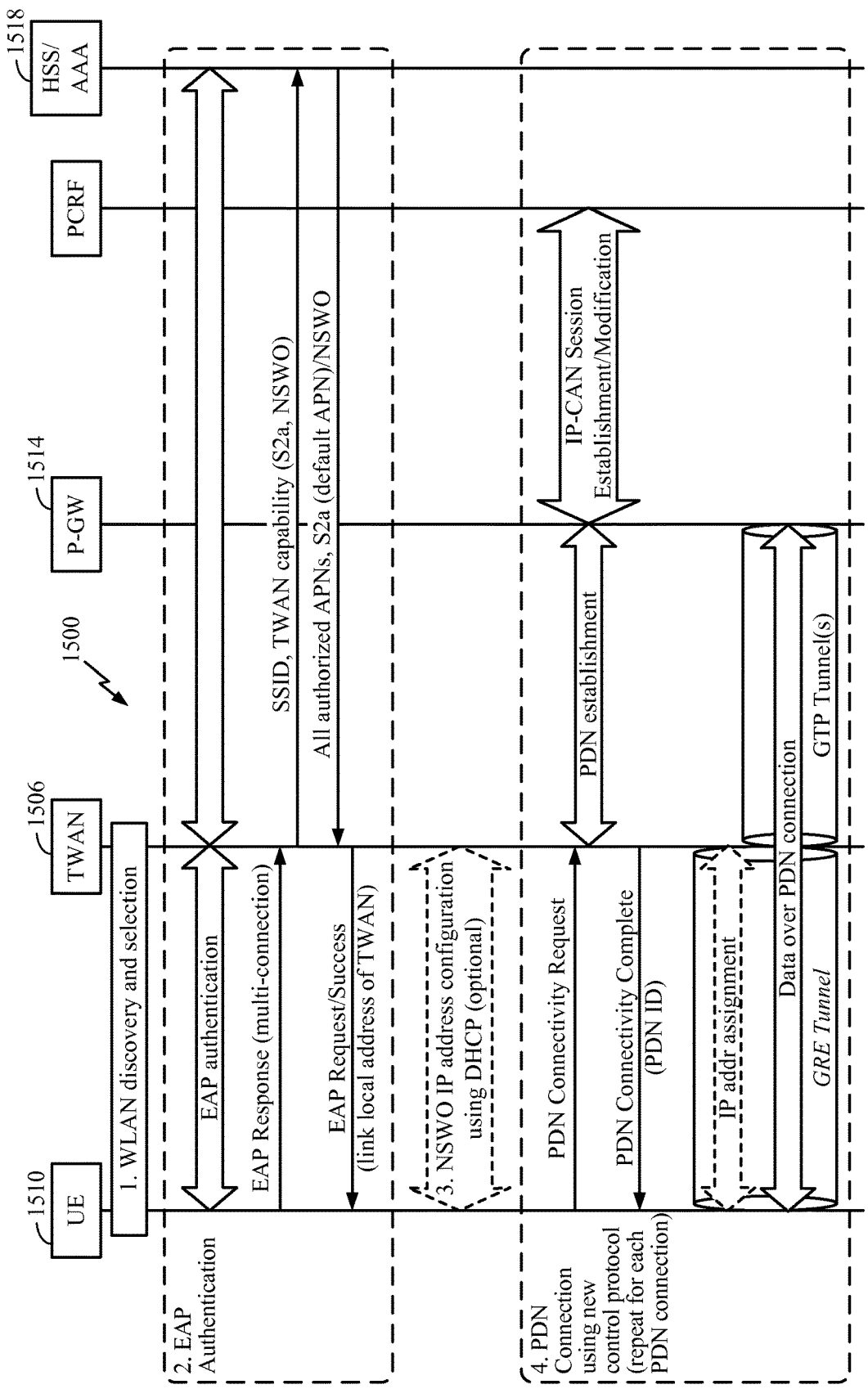
FIG. 15 illustrates a call flow describing one example approach of control protocol over Internet protocol (IP), in accordance with aspects of the present disclosure.

FIG. 15 illustrates an example call flow 1500 according to the second example approach where the control protocol may be transported over IP, over MAC. In this example approach, if NSWO is not allowed, the UE 1510 may use a link local address or NSWO address for transport of control protocol instead of a GRE tunnel (e.g., such as the GRE tunnel 1420 used in the example approach shown in FIG. 14). In some embodiments, if NSWO is allowed, a local IP address may obtained for control protocol messaging. The link local address may be a IPv4 or IPv6 link local address.

The example approach shown in FIG. 14 may be modem-centric solution which has the benefits of simplicity and a higher-layer solution.

Figure 16:
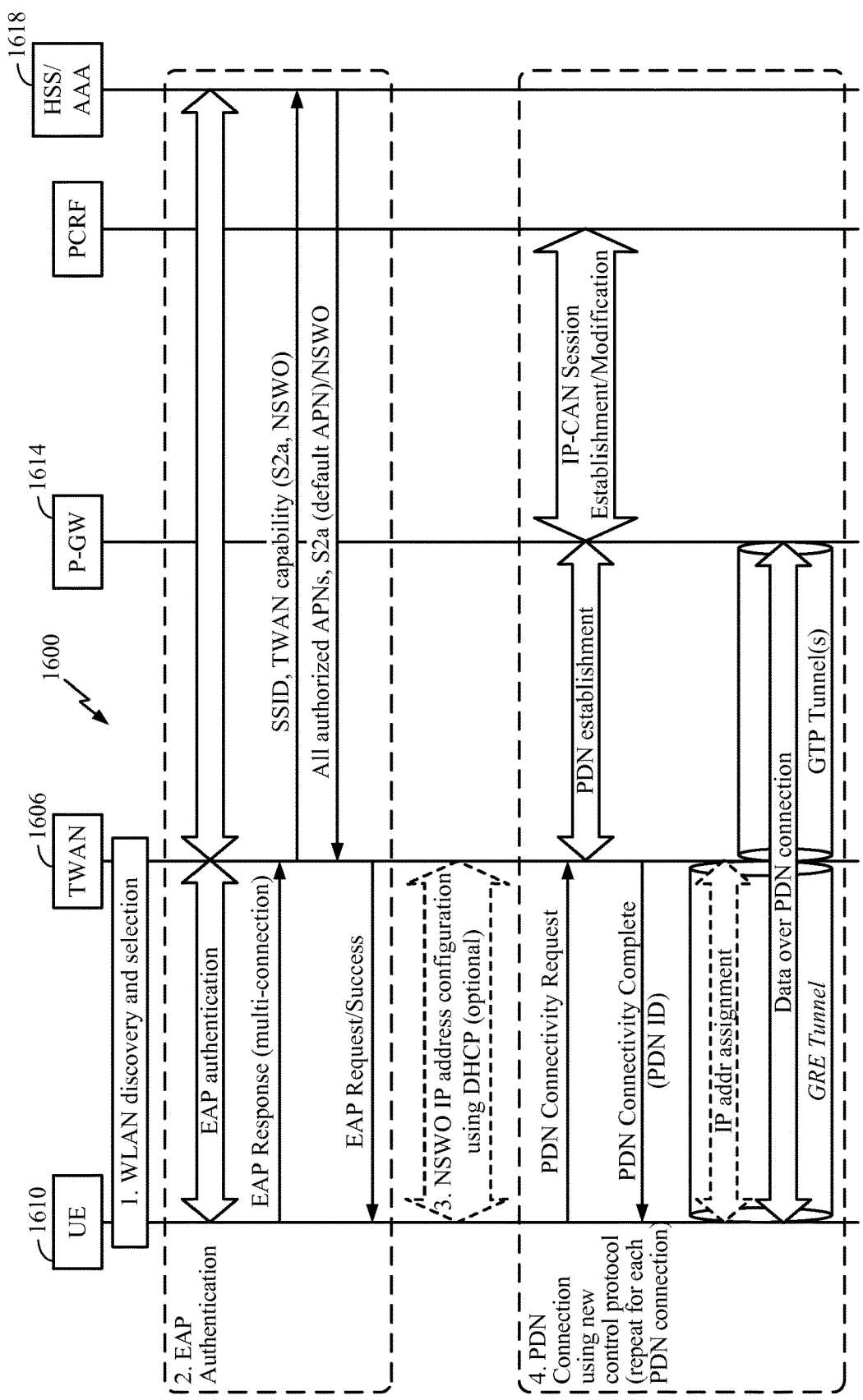
FIG. 16 illustrates a call flow describing one example approach of control protocol over generic advertisement services (GAS), in accordance with aspects of the present disclosure.

FIG. 16 illustrates a call flow 1600 according to the third example approach where the control protocol may be transported over GAS, over MAC, in accordance with certain aspects of the present disclosure. GAS is an 802.11 service that provides transportation for higher-layer frames between stations (e.g., UE and TWAN). As shown in FIG. 16, in 2, the EAP may not provide any additional indications, instead, the control protocol may be carrier over GAS between the UE 1610 and TWAN 1606.

Figure 17:
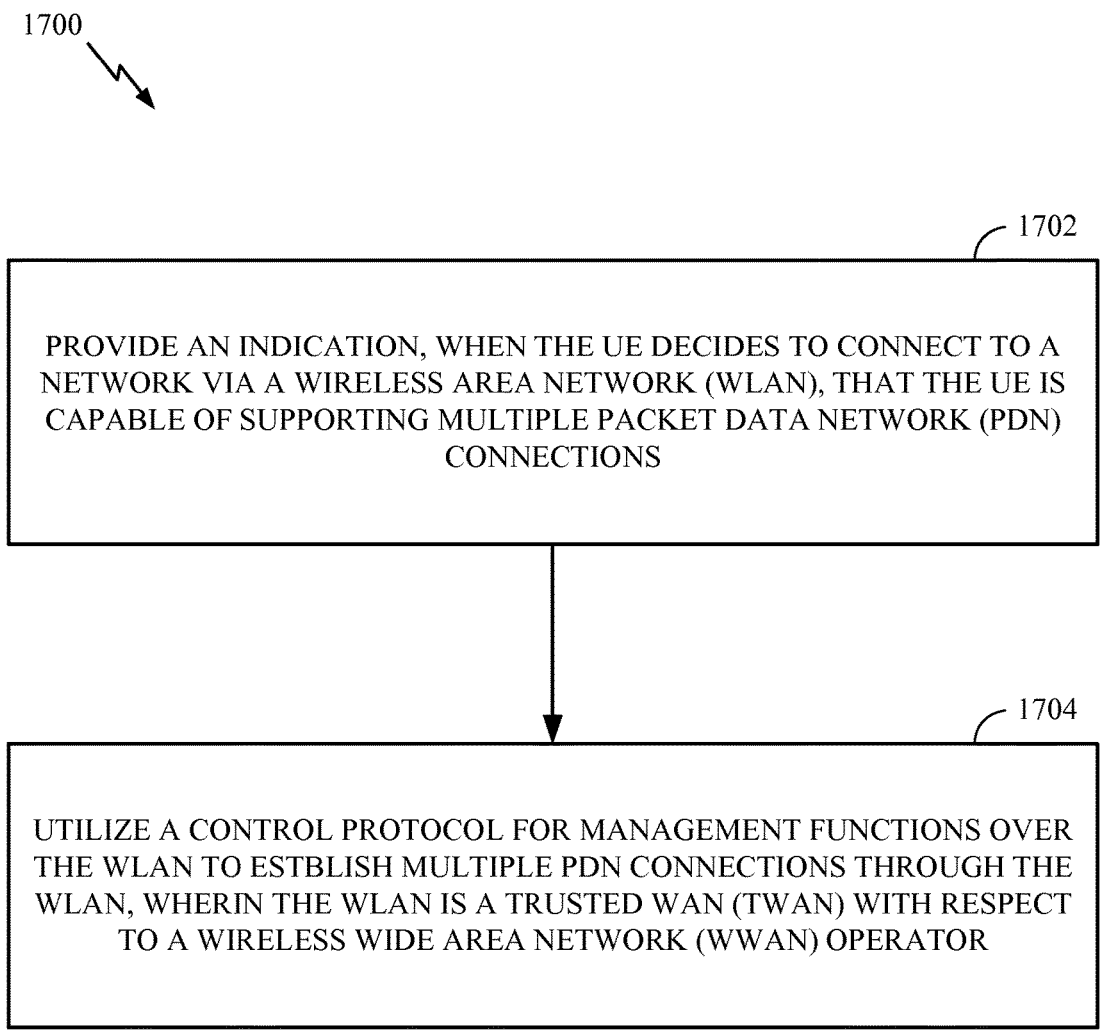
FIG. 17 illustrates example operations that may be performed by a user equipment (UE), in accordance with aspects of the present disclosure, in accordance with aspects of the present disclosure.

FIG. 17 illustrates example operations 1700, in accordance with aspects of the present disclosure. The operations 1700 may be performed, for example, by a UE, such as UE 120 as described above with respect to FIGS. 1 and 3. The operations 1700 may begin, at 1702, by providing an indication, when the UE decides to connect to a network via a WLAN, that the UE is capable of supporting multiple packet data network (PDN) connections.

At 1704, the UE may utilize a control protocol for management functions over the WLAN to establish multiple PDN connections through the WLAN, wherein the WLAN is a trusted WLAN (TWAN) with respect to a wireless wide area network (WWAN) operator. According to certain aspects, the management functions may includes bearer setup, bearer modification, bearer release procedures, or creation of bearers with a QoS.

According to certain aspects, the UE may utilize control protocol to exchange IP-flow mobility filters for providing IP-flow mobility functionality between the WLAN and the WWAN. According to certain aspects, the control protocol may be transported over link layer or network layer tunnels, for example, GRE or VLAN may be used for link layer tunneling. According to certain aspects, the UE may obtain GRE keys to identify a link layer tunnel through extended EAP, static configuration, or a DHCP procedure. Alternatively, the control protocol may be use IP. For example, link local addresses (e.g., IPv4 or IPv6) or a NSWO for tunneling of control protocol messages may be obtained over IP.

According to certain aspects, an IP address for the TWAN may be obtained via extended EAP, DHCP, or multicast discovery.

According to certain aspects, control protocol may be transported over GAS.

Figure 18:
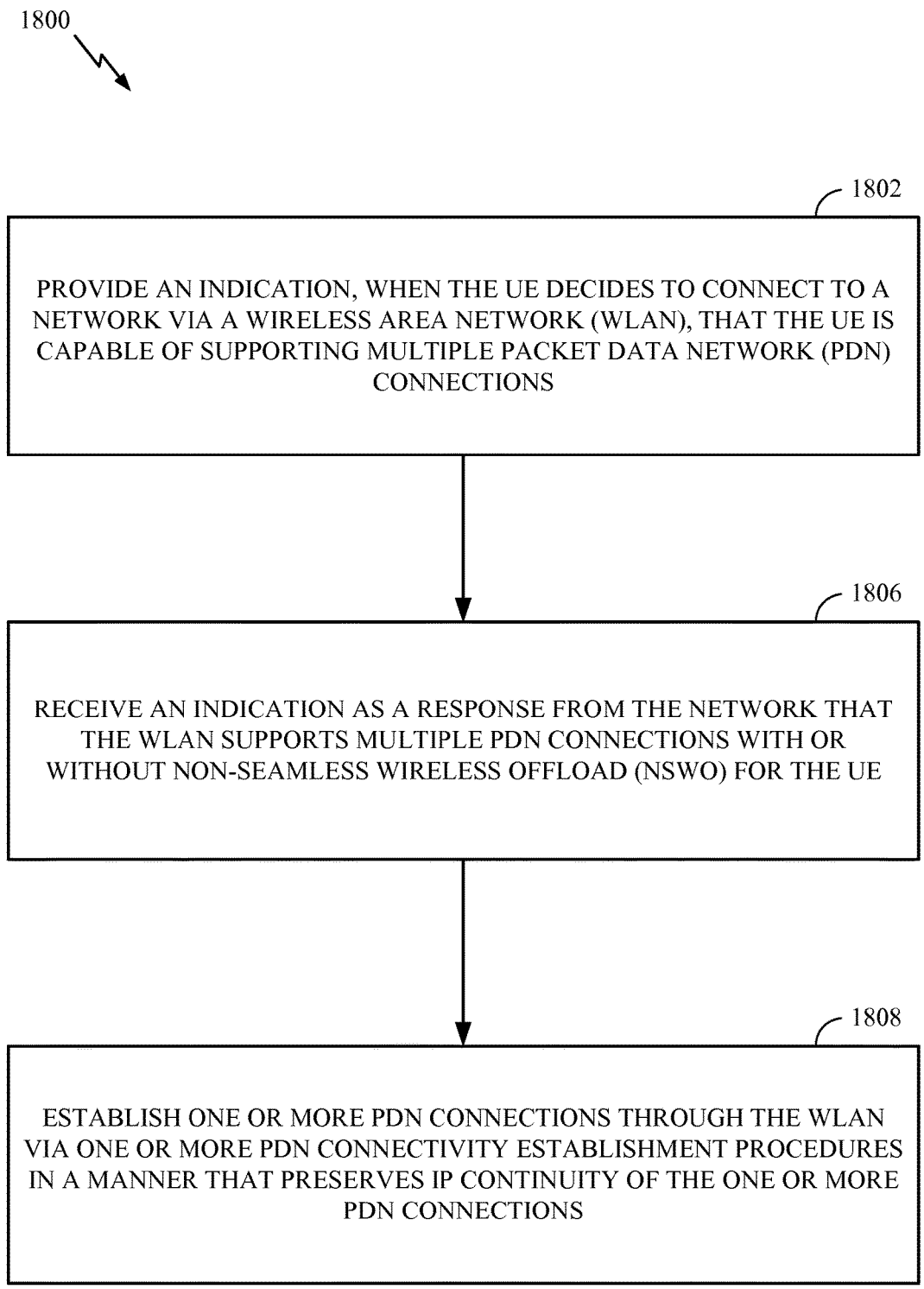
FIG. 18 illustrates example operations that may be performed by a user equipment (UE), in accordance with aspects of the present disclosure, in accordance with aspects of the present disclosure.

FIG. 18 illustrates example operations 1800, in accordance with aspects of the present disclosure. The operations 1800 may be performed, for example, by a UE, such as UE 120 as described above with respect to FIGS. 1 and 3. The operations 1800 may begin, at 1802, by providing an indication, when the UE decides to connect to a network via a WLAN, that the UE is capable of supporting multiple packet data network (PDN) connections.

At 1804, the UE may receive an indication as a response from the network that the WLAN supports multiple PDN connections with or without non-seamless wireless offload (NSWO) for the UE.

At 1806, the UE may establish one or more PDN connections through the WLAN via one or more PDN connectivity establishment procedures in a manner that preserves IP continuity of the one or more PDN connections. For example, the PDN connections may be established using link layer or network layer tunnels. According to certain embodiments, an APN may be signaled in the PDN connectivity establishment procedure. A PDN Connectivity Complete message from the network may indicate a PDN identifier and optionally IP address(es) assigned to the UE for the corresponding PDN connection. GRE tunneling may be used to identify or separate (differentiate) PDN connections. According to certain aspects, the protocol may be implemented in a modem processor.

Figure 19:
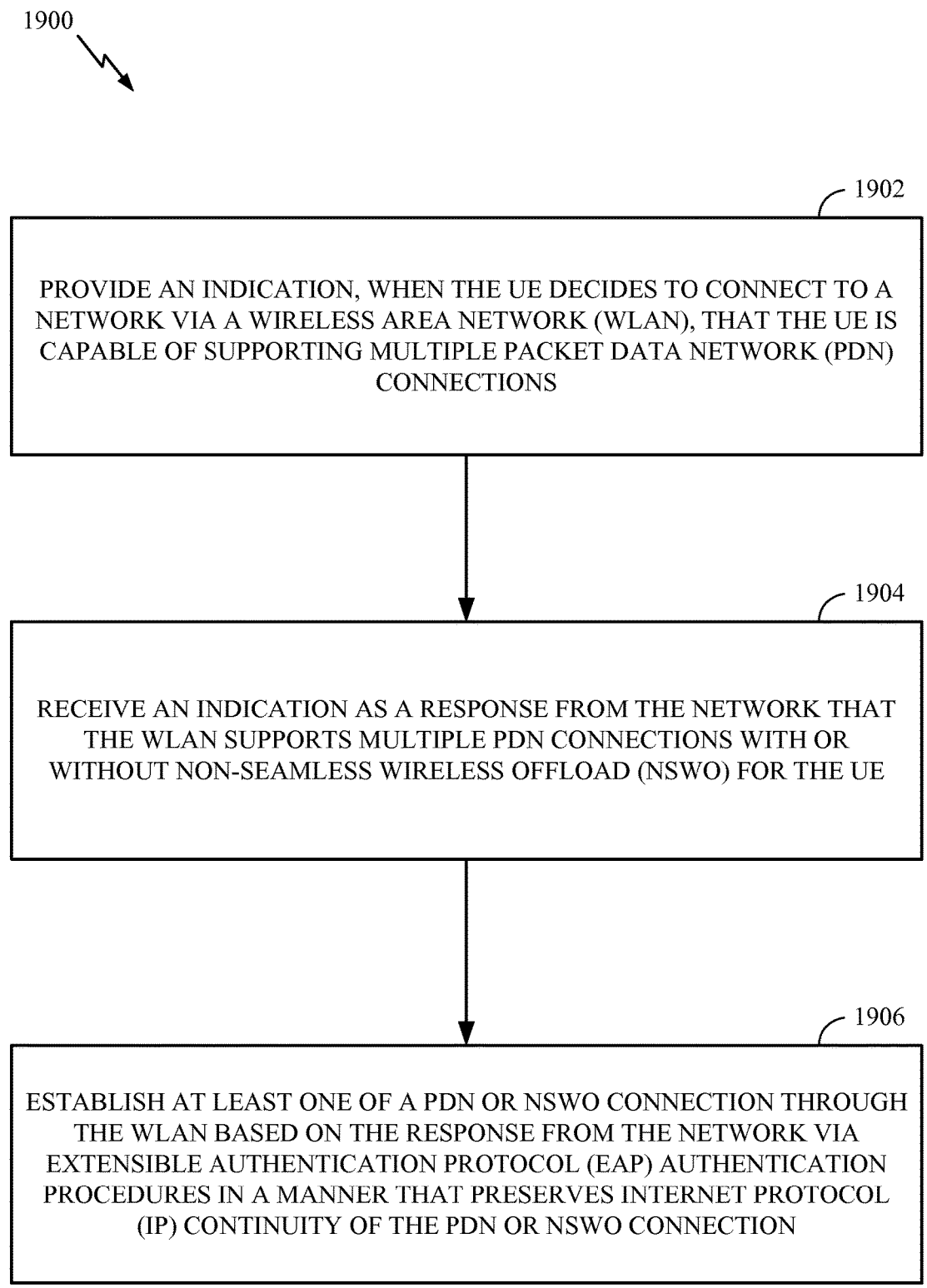
FIG. 19 illustrates example operations that may be performed by a user equipment (UE), in accordance with aspects of the present disclosure, in accordance with aspects of the present disclosure.

FIG. 19 illustrates example operations 1900, in accordance with aspects of the present disclosure. The operations 1900 may be performed, for example, by a UE, such as UE 120 as described above with respect to FIGS. 1 and 3. The operations 1900 may begin, at 1902, by providing an indication, when the UE decides to connect to a network via a WLAN, that the UE is capable of supporting multiple packet data network (PDN) connections.

At 1904, the UE may receive an indication as a response from the network that the WLAN supports multiple PDN connections with or without non-seamless wireless offload (NSWO) for the UE.

At 1906, the UE may establish at least one of a PDN or NSWO connection through the WLAN based on the response from the network via extensible authentication protocol (EAP) authentication procedures in a manner that preserves internet protocol (IP) continuity of the PDN or NSWO connection. According to certain aspects, a single connection through the WLAN may be established if the UE does not indicate capability of multiple PDN connections or single connection or if a response indicating the WLAN supports multiple PDN connections is not received by the UE.

Figure 20:
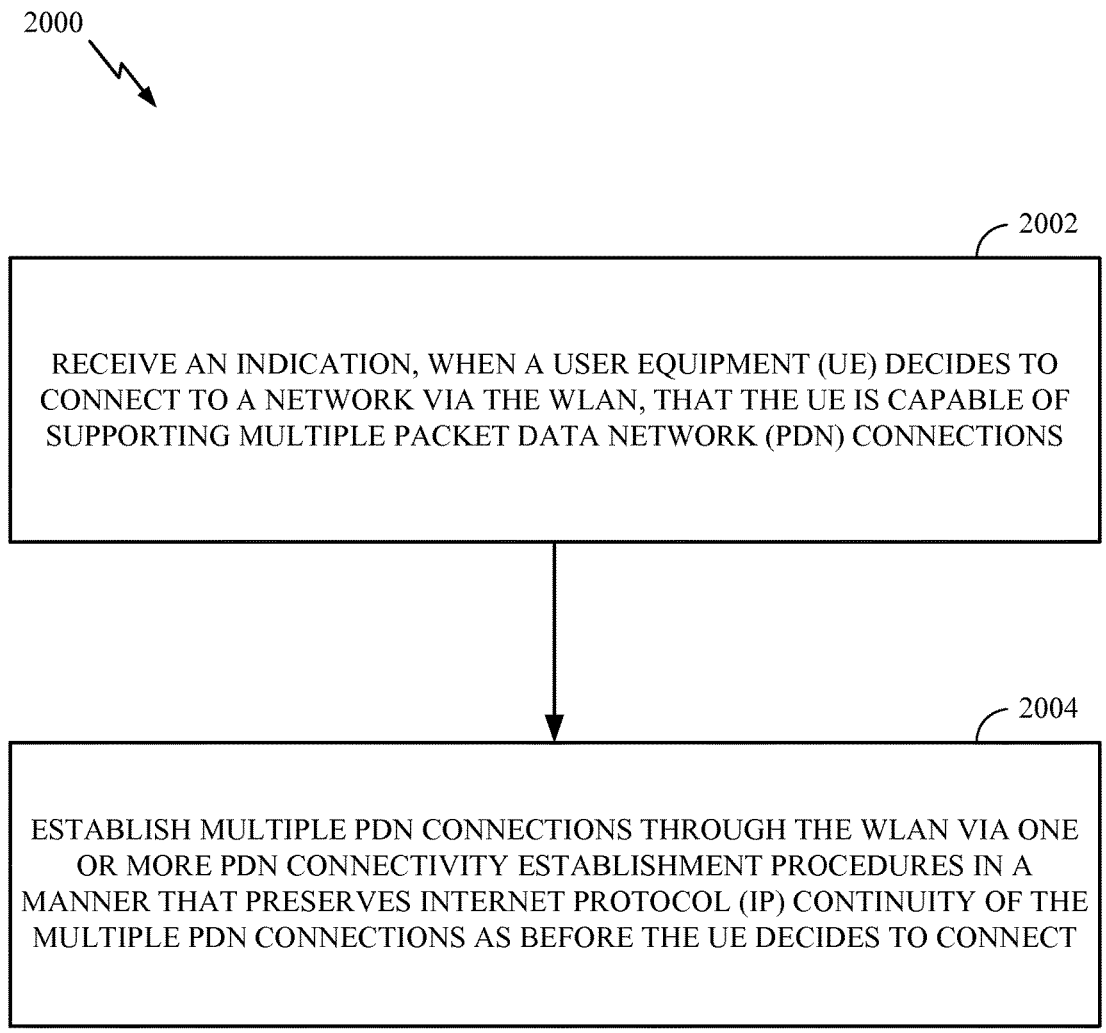
FIG. 20 illustrates example operations that may be performed by a wireless local area network (WLAN) entity, in accordance with aspects of the present disclosure, in accordance with aspects of the present disclosure.

FIG. 20 illustrates example operations 2000, in accordance with aspects of the present disclosure. The operations 2000 may be performed, for example, by a wireless local area network (WLAN) entity. The operations 2000 may begin, at 2002, by receiving an indication, when a user equipment (UE) decides to connect to a network via the WLAN, that the UE is capable of supporting multiple packet data network (PDN) connections.

At 2004, the WLAN entity may establish multiple PDN connections through the WLAN via one or more PDN connectivity establishment procedures in a manner that preserves internet protocol (IP) continuity of the multiple PDN connections as before the UE decides to connect.

According to certain aspects, the WLAN may be WiFi hot spot operated by a WWAN operator. According to certain aspects, the multiple PDN connections may use link layer or network layer tunnels (e.g., GRE tunneling). According to certain aspects, the signaling for each PDN connectivity establishment procedure may indicate an APN (e.g., in a PDN Connection Complete message). According to certain aspects, if NSWO is allowed, a NSWO connection is established prior to establishing the PDN connections. Alternatively, if NSWO is not allowed by the WLAN operator, only PDN connections may be established. According to certain aspects, DHCP and RS/RA procedure for acquiring local IP address(es) may be skipped.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    providing an indication, when the UE decides to connect to a network via a wireless local area network (WLAN), that the UE is capable of supporting multiple packet data network (PDN) connections, wherein the WLAN is a trusted WLAN (TWAN) with respect to a wireless wide area network (WWAN) operator;
    obtaining one or more first Internet protocol (IP) addresses to identify a tunnel carrying a control protocol, different than a dynamic host control protocol (DHCP), via an extensible authorization protocol (EAP) procedure with the WLAN;
    utilizing the control protocol for management functions over the WLAN to establish and manage multiple PDN connections through the WLAN via one or more PDN connectivity establishment procedures in a manner that preserves IP continuity of the PDN connections, wherein:
        the management functions comprise at least one of bearer setup, bearer modification, or bearer release procedures, and
        the control protocol is transported over IP, medium access control (MAC) protocol, and physical layer (PHY) protocol for tunneling of control protocol messages to establish and manage the multiple PDN connections; and
    receiving an assigned second IP address for each of the multiple PDN connections from the WLAN via the control protocol, wherein the one or more first IP addresses are different than the assigned second IP address.

2. The method of claim 1, further comprising:
    utilizing the control protocol to exchange IP-flow mobility filters for providing IP-flow mobility functionality between the WLAN and the WWAN.

3. The method of claim 1, wherein the management functions comprise creation of bearers with a quality of service (QoS).

4. The method of claim 1, wherein the UE utilizes a non-seamless WLAN offload (NSWO) address for tunneling of the control protocol messages over IP.

5. The method of claim 1, wherein the second IP addresses comprise at least one of IPv4 or IPv6 link local addresses.

6. The method of claim 1, the one or more first IP addresses comprise an IP address for the TWAN.

7. The method of claim 1, wherein the control protocol messages comprise:
    transmitting a PDN connectivity request message to the TWAN including at least one of: a handover indication, a connection request, an access point name (APN), or a protocol configuration options (PCO); and
    receiving a PDN connectivity complete message from the TWAN including at least one of: a PDN ID, the second IP address, or a PCO.

8. The method of claim 1, wherein the control protocol further utilizes at least one of: a virtual local area network (VLAN) or generic advertisement services (GAS) for tunneling of control protocol messages to establish the multiple PDN connections.

9. The method of claim 1, further comprising receiving an indication of a MAC address associated with each PDN connection.

10. The method of claim 1, further comprising receiving traffic data for the UE via GPRS tunneling protocol (GTP).

11. An apparatus for wireless communications by a user equipment (UE), comprising:
means for providing an indication, when the UE decides to connect to a network via a wireless local area network (WLAN), that the UE is capable of supporting multiple packet data network (PDN) connections, wherein the WLAN is a trusted WLAN (TWAN) with respect to a wireless wide area network (WWAN) operator;
means for obtaining one or more first Internet protocol (IP) addresses to identify a tunnel carrying a control protocol, different than a dynamic host control protocol (DHCP), via an extensible authorization protocol (EAP) procedure with the WLAN; and
means for utilizing the control protocol for management functions over the WLAN to establish and manage multiple PDN connections through the WLAN via one or more PDN connectivity establishment procedures in a manner that preserves IP continuity of the PDN connections, wherein:
the management functions comprise at least one of bearer setup, bearer modification, or bearer release procedures,
the control protocol is transported over IP, medium access control (MAC) protocol, and physical layer (PHY) protocol for tunneling of control protocol messages to establish and manage the multiple PDN connections; and
means for receiving an assigned second IP address for each of the multiple PDN connections from the WLAN via the control protocol, wherein the one or more first IP addresses are different than the assigned second IP address.

12. The apparatus of claim 11, further comprising:
means for utilizing the control protocol to exchange IP-flow mobility filters for providing IP-flow mobility functionality between the WLAN and the WWAN.

13. The apparatus of claim 11, wherein the management functions comprise creation of bearers with a quality of service (QoS).

14. The apparatus of claim 11, wherein the UE utilizes a non-seamless WLAN offload (NSWO) address for tunneling of the control protocol messages over IP.

15. The apparatus of claim 11, wherein the second IP addresses comprise at least one of IPv4 or IPv6 link local addresses.

16. The apparatus of claim 11, wherein the one or more first IP addresses comprise an IP address for the TWAN.

17. An apparatus for wireless communications by a user equipment (UE), comprising:
at least one processor configured to:
provide an indication, when the UE decides to connect to a network via a wireless local area network (WLAN), that the UE is capable of supporting multiple packet data network (PDN) connections, wherein the WLAN is a trusted WLAN (TWAN) with respect to a wireless wide area network (WWAN) operator;
obtain one or more first Internet protocol (IP) addresses to identify a tunnel carrying a control protocol, different than a dynamic host control protocol (DHCP), via an extensible authorization protocol (EAP) procedure with the WLAN;
utilize the control protocol for management functions over the WLAN to establish and manage multiple PDN connections through the WLAN via one or more PDN connectivity establishment procedures in a manner that preserves IP continuity of the PDN connections, wherein:
the management functions comprise at least one of bearer setup, bearer modification, or bearer release procedures, and
the control protocol is transported over IP, medium access control (MAC) protocol, and physical layer (PHY) protocol for tunneling of control protocol messages to establish and manage the multiple PDN connections; and
a memory coupled with the at least one processor; and
receive an assigned second IP address for each of the multiple PDN connections from the WLAN via the control protocol, wherein the one or more first IP addresses are different than the assigned second IP address.

18. The apparatus of claim 17, wherein the at least one processor is further configured to:
utilize the control protocol to exchange IP-flow mobility filters for providing IP-flow mobility functionality between the WLAN and the WWAN.

19. The apparatus of claim 17 wherein the management functions comprise creation of bearers with a quality of service (QoS).

20. The apparatus of claim 17, wherein the UE utilizes a non-seamless WLAN offload (NSWO) address for tunneling of the control protocol messages over IP.

21. The apparatus of claim 17, wherein the second IP addresses comprise at least one of IPv4 or IPv6 link local addresses.

22. The apparatus of claim 17, wherein the one or more first IP addresses comprise an IP address for the TWAN.

23. A non-transitory computer-readable medium storing computer executable code, comprising:
code for providing an indication, when the UE decides to connect to a network via a wireless local area network (WLAN), that the UE is capable of supporting multiple packet data network (PDN) connections, wherein the WLAN is a trusted WLAN (TWAN) with respect to a wireless wide area network (WWAN) operator;
code for obtaining one or more first Internet protocol (IP) addresses to identify a tunnel carrying a control protocol, different than a dynamic host control protocol (DHCP), via an extensible authorization protocol (EAP) procedure with the WLAN; and
code for utilizing the control protocol for management functions over the WLAN to establish and manage multiple PDN connections through the WLAN via one or more PDN connectivity establishment procedures in a manner that preserves IP continuity of the PDN connections, wherein:
the management functions comprise at least one of bearer setup, bearer modification, or bearer release procedures, and
the control protocol is transported over IP, medium access control (MAC) protocol, and physical layer (PHY) protocol for tunneling of control protocol messages to establish and manage the multiple PDN connections; and
code for receiving an assigned second IP address for each of the multiple PDN connections from the WLAN via the control protocol, wherein the one or more first IP addresses are different than the assigned second IP address.

24. The non-transitory computer-readable medium of claim 23, the instructions further comprising:

code for utilizing the control protocol to exchange IP-flow mobility filters for providing IP-flow mobility functionality between the WLAN and the WWAN.

25. The non-transitory computer-readable medium of claim 23, wherein the management functions comprise creation of bearers with a quality of service (QoS).

26. The non-transitory computer-readable medium of claim 23, wherein the UE utilizes a non-seamless WLAN offload (NSWO) address for tunneling of the control protocol messages over IP.

27. The non-transitory computer-readable medium of claim 23, wherein the second IP addresses comprise at least one of IPv4 or IPv6 link local addresses.

28. The non-transitory computer-readable medium of claim 23, wherein the one or more first IP addresses comprises an IP address for the TWAN via at least one of EAP, DHCP, or through multicast discovery.

\* \* \* \* \*